United States Patent [19]
Wakabayashi et al.

[11] Patent Number: 5,848,374
[45] Date of Patent: Dec. 8, 1998

[54] MAP INFORMATION PROCESSING METHOD AND APPARATUS FOR CORRELATING ROAD LOCATION ON A ROAD NETWORK MAP

[75] Inventors: Kaoru Wakabayashi, Kanagawaken; Masahiko Iwata, Aichiken; Tadashi Nunobiki; Tsuneo Yasuda, both of Kanagawaken, all of Japan

[73] Assignee: Nippon Telegraph and Telephone Corporation, Tokyo, Japan

[21] Appl. No.: 609,451

[22] Filed: Mar. 1, 1996

[30] Foreign Application Priority Data

Mar. 6, 1995 [JP] Japan .................................. 7-045999
Mar. 6, 1995 [JP] Japan .................................. 7-046000

[51] Int. Cl.$^6$ ................................................ G06F 165/00
[52] U.S. Cl. ......................... 701/212; 701/208; 340/990; 340/995
[58] Field of Search ................................. 701/200, 208, 701/212, 202, 210, 211, 207, 209, 55–56; 340/990, 988, 995

[56] References Cited

U.S. PATENT DOCUMENTS

| 5,444,618 | 8/1995 | Seki et al. . |
| 5,502,640 | 3/1996 | Yagyu et al. . |
| 5,739,848 | 4/1998 | Shimoura et al. ...................... 701/117 |

FOREIGN PATENT DOCUMENTS

| 0 556 400 A1 | 8/1993 | European Pat. Off. . |
| 92 03 919.7 | 8/1992 | Germany . |

OTHER PUBLICATIONS

Article entitled, "An Interpretation System for Land Register Maps", Boatto, et al., Jul. 1992, pp. 25–32;.

Article from *Systems & Computers in Japan*, entitled, "Automatic Extraction of Roads Denoted by Parallel Lines from 1/25,000–Scaled Maps Utilizing Ski–Scan Method,", Nagano, et al., vol. 21, No. 11, Jan. 1, 1990, pp. 96–104;.

Article from *Computer Journal*, entitled, "Road Extraction and Topographic Data Validation Using Area Topology", Varley et al., vol. 37, 1994, pp. 3–45;.

Article entitled, Original Method for Features Extraction and Vectorization; Application to Cadastral Maps; Ogler, et al., dated Nov. 15, 1993, pp. 2098–2103.

Article entitled, "Extraction of Roads from Topological Maps Using a Parallel Extraction Algorithm", Miyatake, et al., pp. 77–86, vol. 16, No. 6, 1985.

Abstract of GIS — Theory and Applications of GIS, vol. 2, Mar. 1994, pp. 33–40;.

(List continued on next page.)

*Primary Examiner*—Jacques H. Louis Jacques
*Assistant Examiner*—Gertrude Arthur
*Attorney, Agent, or Firm*—Banner & Witcoff Ltd.

[57] ABSTRACT

A map processing apparatus may receive information on a road network map and a housing map. A coordinate transforming section may absorb difference in reduction scale and coordinate system as much as possible between the road network map and the housing map by means of geometric transformation. A corresponding candidate detecting section may detect a plurality of corresponding candidate points as candidates of corresponding points on the other arbitrary map to the road constituent points by collating road images near respective road constituent points on the road network map with road images of corresponding location on the other arbitrary map. A correspondence determining section may determines one corresponding candidate point based on derived similarities corresponding to respective corresponding candidate points by selecting one of the plurality of corresponding candidate points one by one with respect to respective road constituent points, and verifying similarity between shifted entire profile of road network and original entire profile of road network based on feature amounts representing intersecting angles of roads to be connected mutually on respective road constituent points while shifting respective road constituent points to locations of selected corresponding candidate points.

18 Claims, 22 Drawing Sheets

OTHER PUBLICATIONS

Abstract of Generating a Road–Network from Map Data with Vector Representation, EIC Spring National Meeting, D–466 (1994).

Article entitled "1993 IEEE Region 10 Conference on Computer, Communication, Control and Power Engineering," pp.1046–1049, vol. 2 of 5, Oct. 19–21, 1993, Beijing, China.

Article of Proceedings of the SPIE Conference on Visual Communication and Image Processing, vol. 2094, 8 Nov. 1993, entitled "Pedestrian Counting System Robust against Illumination Changes" by Sato et al., pp. 1259–1270.

FIG.3

| ROAD CONSTITUENT POINT | | CORRESPONDING CANDIDATE POINT | | |
|---|---|---|---|---|
| | COORDINATE | ORDER | COORDINATE | CORRESPONDENCE RATE OF ROAD PLANE |
| $P_1$ | $(x_{10}, y_{10})$ | FIRST CANDIDATE | $(x_{11}, y_{11})$ | $E_{11}$ |
| | | SECOND CANDIDATE | $(x_{12}, y_{12})$ | $E_{12}$ |
| | | ⋮ | ⋮ | ⋮ |
| ⋮ | | | | |
| $P_i$ | $(x_{i0}, y_{i0})$ | FIRST CANDIDATE | $(x_{i1}, y_{i1})$ | $E_{i1}$ |
| | | SECOND CANDIDATE | $(x_{i2}, y_{i2})$ | $E_{i2}$ |
| | | ⋮ | ⋮ | ⋮ |
| ⋮ | | | | |

Pi : ROAD CONSTITUENT POINT

ROAD NETWORK ROAD

ROAD MARGIN LINE ON HOUSING MAP

Pi : ROAD CONSTITUENT POINT $P1(x_{io}, y_{io})$

TEMPLATE

RADIUS OF TEMPLATE

ROAD PLANE OF ROAD NETWORK

Pi : ROAD CONSTITUENT POINT

Pi : ROAD CONSTITUENT POINT

ROAD PLANE SIDE
(COLOR Cs)

ROAD PLANE
(COLOR Cd)

ROAD PLANE SIDE
(COLOR Cs)

NON-ROAD PLANE

ROAD MARGIN LINE

MAP INFORMATION PROCESSING METHOD AND APPARATUS FOR CORRELATING ROAD LOCATION ON A ROAD NETWORK MAP

BACKGROUND OF THE INVENTION

1. Field of the Invention

The present invention relates to an automatic road recognition method capable of recognizing automatically road planes from such a map that road profiles are represented by disconnected incomplete margin lines and a recognition apparatus for embodying the same, and relates to a map information processing method permitting mutual utilization of information between plural maps having their different purposes or reduced scales by means of the above method/apparatus and an processing apparatus for embodying the same.

2. Description of the Related Art

In general, a map is represented by a reduction scale and a coordinate system suitable for purpose of utilization. Various data such as constituent elements and related attribute information are prepared on the map. A repletion degree of data as for the constituent elements would be deflected according to the purpose, subject or reduced scale of respective maps. For instance, the road network map being used for car navigation, etc. is depicted on the reduction scale of such as 1:25000 or 1:50000, which is known as a small-scale map. Attribute information relating to vehicle such as connection relations of respective roads, length and width of each road, etc. are in abundance, but information of facilities, etc. are scarcely provided. On the contrary, the housing map on which building information being recited is depicted on the reduction scale of about 1:2500, which is known as a large-scale map. Information as for profiles, names, and residents of respective buildings, etc. are recited in detail, but as for road information only road profiles are depicted by mere line segments representing road margins. Therefore, process for the road connection such as route search, etc. cannot be executed as it is.

In the meanwhile, for the purpose of highly utilizing the road information which being one of the most important items in various information included in the map, automatic extraction of the road network, i.e., the road connection relation represented by a graphic structure, from data of the road profiles recited on the housing map has been studied. For instance, M. Horie et al., entitled "Generating a Road-Network from Map Data with Vector Representation", EIC Spring National Meeting, D-466 (1994), and H. YOMONO, entitled "A Method to Generate a Road Network from Road Margins Data", Theory and Applications of GIS, Vol.2, No.1, pp.33–40 (1994) have been reported.

However, techniques recited in these literatures can be applied only to the map, as shown in FIG. 29, wherein non-road planes are digitized as closed polygons, i.e., wherein roads may be grasped as planes. Conversely, in the above housing maps, a plenty of housing maps may include the road profiles which are represented by disconnected incomplete line segments of the road margins, as shown in FIG. 30. Thus, in the case of such housing map, it is difficult for the computer to recognize the road planes. For this reason, even if the above techniques are employed, it is impossible for the computer to execute automatic extraction of the road network.

In order to extract automatically the road network in terms of the above techniques from the housing maps having incomplete road information, road information must be prepared in advance manually so that they can meet predetermined conditions, for example, the road margin lines may be formed by polygon which surrounding continuously the non-road planes, and the like. In such case, enormous labor is needed. In particular, in case the large-scale maps must be handled which may intend to represent actual road profiles on the map as true as possible, operations become further complicate and massive.

In any event, there are requests for mutual utilization of map information between a plurality of maps which are prepared for foregoing different purposes or reduced scales. For purposes of example, there is the case wherein building information would be diverted from the housing map to other maps since the road network map would be rich in road network information but would be insufficient in building information However, even if such operations are tried by automatically superposing both maps under the same scale and coordinate system in terms of coordinate transformation, they are difficult because location precision is insufficient due to different purposes or different preciseness of both maps. Therefore, it has not been considered yet. In the prior art, necessary information have been extracted by correlating both maps manually while comparing them with each other. For this reason, such operations entail enormous economic and time loss. As a result, it has been difficult to utilize map information integrally and effectively between different kind maps.

SUMMARY OF THE INVENTION

The present invention has been made in view of the above circumstances, and an abject of the present invention is to provide an automatic road recognition method capable of recognizing automatically road planes from such a map that road profiles are represented by disconnected incomplete margin lines and a recognition apparatus for embodying the same.

Another object of the present invention is to provide a map information processing method capable of correlating automatically arbitrary plural maps such as road network map, housing map, etc., which contain location errors because of their different purposes or their different reduced scales, based on their road information.

In order to achieve the above objects, according to an aspect of the present invention, there is provided an automatic road recognition method employing a computer, comprising the steps of inputting road margin line information representing road profile on a map to thus detect as road plane candidates a plurality of portions being put between road margin lines which can be regarded locally as parallel lines mutually, estimating that either side of the road margin lines is the road plane according to a distribution state of the road plane candidates on both sides of the road margin lines, and determining as the road plane an region which resides between two road margin lines opposing to each other on the side estimated as the road plane side.

According to another aspect of the present invention, there is provided an automatic road recognition method employing a computer comprising the steps of inputting road margin line information representing road profile on a map and non-road figure information which cannot reside in road planes, to thus detect as road plane candidates a plurality of portions being put between road margin lines which can be regarded locally as parallel lines mutually and in which non-road figure cannot reside in the road margin line, estimating that either side of the road margin lines is the road plane according to a distribution state of the road plane candidates and the non-road figure on both sides of the road margin lines, and determining as the road plane an region which resides between two road margin lines opposing to each other on the side estimated as the road plane side and in which the non-road figure cannot reside.

According to still another aspect of the present invention, there is provided an automatic road recognition apparatus comprising a road candidate detecting means for detecting as road plane candidates a plurality of portions being put between road margin lines which can be regarded locally as parallel lines mutually by inputting road margin line information representing road profile on a map, a road plane side estimating means for estimating that either side of the road margin lines is the road plane according to a distribution state of the road plane candidates on both sides of the road margin lines, and a road plane determining means for determining as the road plane an region which resides between two road margin lines opposing to each other on the side estimated as the road plane side.

In the automatic road recognition method and the apparatus for the same, since portions being put between substantially parallel road margin lines may be detected as road plane candidates, most of actual road planes may be grasped as road plane candidates, except the portions wherein the road margin lines are not formed as paired lines on both sides of the road and incomplete. Even if non-road planes are mixed partially, the road plane sides may be estimated with higher reliability since the road planes are examined in a more widely viewed fashion. The portions having incomplete road margin lines may be interpolated based on information of the road plane sides, and then the road planes may be determined.

According to further aspect of the present invention, there is provided a map information processing method employing a computer comprising the steps of inputting a road network map which includes road constituent points formed of starting points, end points and interpolation points, and information indicating locations of the road constituent points and represents connection relations between respective roads as a graphic structure, and an other arbitrary map which includes road profile information, detecting a plurality of corresponding candidate points as candidates of corresponding points on the other arbitrary map to the road constituent points by collating road images near respective road constituent points on the road network map with road images of corresponding location on the other arbitrary map, and correlating road location on the road network map with road location on the other arbitrary map, by selecting one of the plurality of corresponding candidate points one by one with respect to respective road constituent points, verifying similarity between shifted entire profile of road network and original entire profile of road network based on feature amounts representing intersecting angles of roads to be connected mutually on respective road constituent points while shifting respective road constituent points to locations of selected corresponding candidate points, and determining one corresponding candidate point based on derived similarities corresponding to respective corresponding candidate points.

In the map information processing method, since corresponding candidate points may be picked up by collating road images around the road constituent points with road images on the arbitrary map, location displacement may be admissible within the specified distance between both maps. In addition, as to the feature amount such that intersecting angle between connecting roads used to determination of the corresponding candidate points, when one road constituent point is shifted to other corresponding candidate point, the feature amount of other adjacent road constituent points may be also affect by the shifted result, so that corresponding points with respect to respective road constituent points may be determined by means of repetitive process using a relaxation method such that appropriate widely viewed road network profile can be obtained. Thereby the road constituent points may be automatically correlated between maps including location errors.

In the embodiment of the present invention, the map information processing method further comprises, after determining one corresponding candidate point with respect to respective road constituent points, the steps of selecting two from respective corresponding candidate points at a time, determining that either of both corresponding candidate points has high correspondence rate to a corresponding road on the other arbitrary map, and rotating and shifting other corresponding candidate point while a corresponding candidate point which is determined to have the high correspondence rate being fixed until the correspondence rate of other corresponding candidate point to road on the other arbitrary map takes a maximum value.

In the embodiment of the present invention, the map information processing method further comprises, after determining one corresponding candidate point with respect to respective road constituent points, the steps of selecting two from respective corresponding candidate points at a time, determining that either of both corresponding candidate points has high correspondence rate to a corresponding road on the other arbitrary map, and rotating and shifting other corresponding candidate point while a corresponding candidate point which is determined to have the high correspondence rate being fixed until an angle between an angle of road network obtained based on both corresponding candidate points and an angle of a road on the other arbitrary map takes a minimum value.

With the above two methods, road constituent points may be correlated with each other with well precision.

In the embodiment of the present invention, the map information processing method further comprises the step of integrating the road network map with the other arbitrary map based on correlation of road location between the road network map and the other arbitrary map by effecting correlation with respect to map information other than road.

In this method, different kinds of maps including location errors are automatically correlated with each other, so that plenty map information on both maps may be integrally utilized.

In the embodiment of the present invention, the map information processing method further comprises the steps of making new maps based on correlation of road location between the road network map and the other arbitrary map by effecting correlation with respect to map information other than road.

In this method, different kinds of maps including location errors are automatically correlated with each other, so that new maps may be made.

In the embodiment of the present invention, the other arbitrary map is a high precision map including road profile information which has higher location precision than that of the road network map.

According to still further aspect of the present invention, there is provided a map information processing apparatus for correlating road location on the road network map with road location on the other arbitrary map by inputting a road network map which includes road constituent points formed of starting points, end points and interpolation points, and information indicating locations of the road constituent points and represents connection relations between respective roads as a graphic structure, and an other arbitrary map which includes road profile information, the apparatus comprising a corresponding candidate detecting means for detecting a plurality of corresponding candidate points as candidates of corresponding points on the other arbitrary map to the road constituent points by collating road images near respective road constituent points on the road network map with road images of corresponding location on the other arbitrary map, and a correspondence determining means for determining one corresponding candidate point based on derived similarities corresponding to respective corresponding candidate points by selecting one of the plurality of corresponding candidate points one by one with respect to respective road constituent points, and verifying similarity between shifted entire profile of road network and original entire profile of road network based on feature amounts representing intersecting angles of roads to be connected mutually on respective road constituent points while shifting respective road constituent points to locations of selected corresponding candidate points.

In the map information processing method and the apparatus for the same of the present invention, the automatic road recognition method and the apparatus for the same may be utilized if road information on the arbitrary map is disconnected and incomplete.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a schematic view illustrating an example of corresponding candidate point data;

DESCRIPTION OF THE PREFERRED EMBODIMENTS

There will be explained preferred embodiments of the present invention in detail with reference to accompanying drawings hereinafter.

Figure 1:
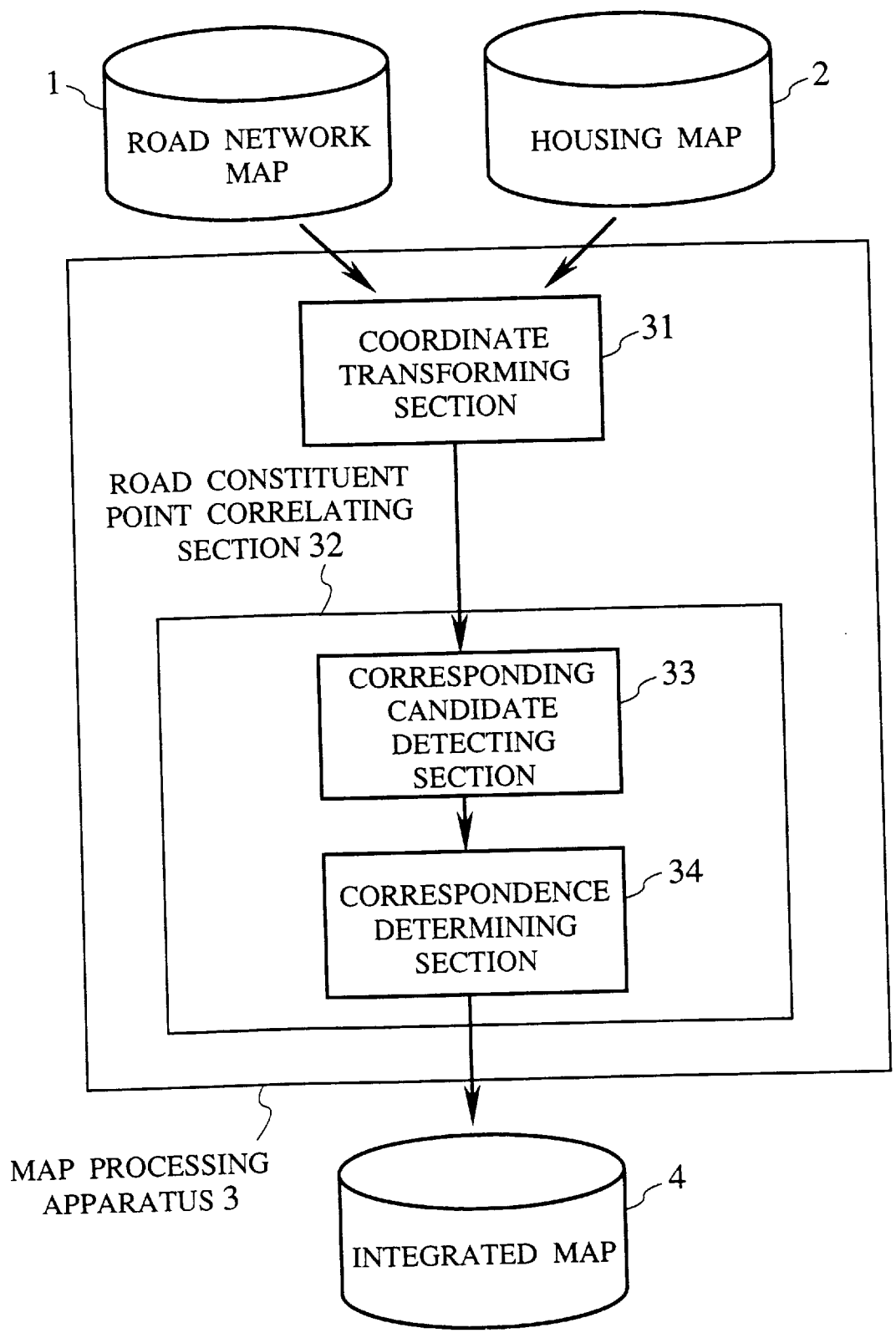
FIG. 1 is a schematic view showing an embodiment of a map information processing method and an apparatus for embodying the same according to the present invention.

FIG. 1 is a schematic view showing an embodiment of a map information processing method and an apparatus for embodying the same according to the present invention.

In FIG. 1, a reference 1 denotes a road network map; 2, housing map; 3, map processing apparatus; and 4, integrated map. In particular, the map processing apparatus 3 is composed of a computer (preferably, CPU), and comprise a coordinate transforming section 31 and a road constituent point correlating section 32. The road constituent point correlating section 32 is formed of a corresponding candidate detecting section 33 and a correspondence determining section 34. Actually the road network map 1 and the housing map 2 are in the form of database stored in an external storage apparatus. Similarly the integrated map 4 obtained by integrating the road network map 1 and the housing map 2 with each other is also in the form of database.

Figure 6:
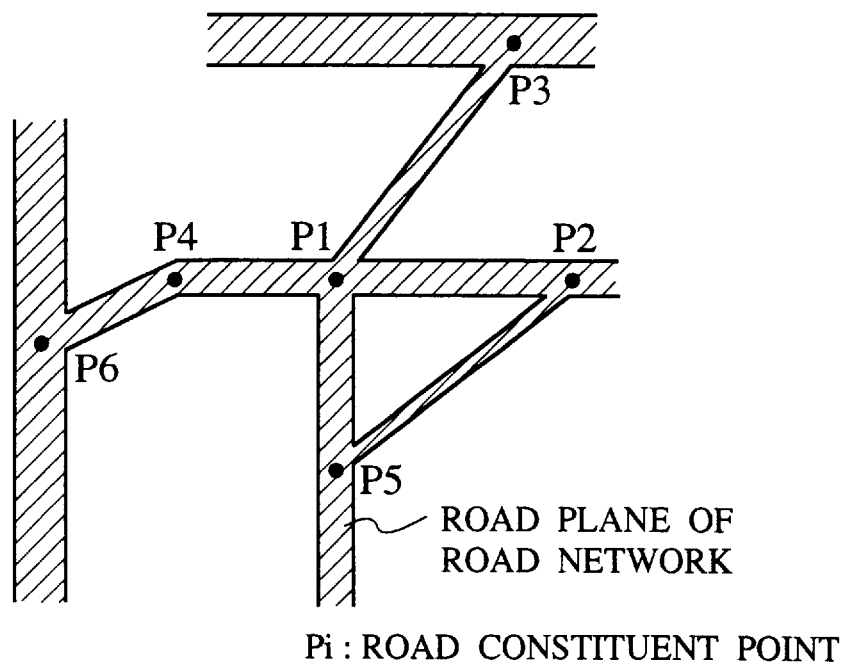
FIG. 6 is a fragmental enlarged view illustrating an example of a road network map.
Figure 7:
FIG. 7 is a fragmental enlarged view illustrating an example of road information of a housing map.

The road network map 1 may be depicted by means of universal lateral Mercator projection on the reduction scale of such as 1:25000 or 1:50000, which is known as a small-scale map. The road network map 1 may represent a graphic structure of road connection relationships, which has starting points, end points, and interpolation points of the road as road constituent points and includes road location information and attribute information such as length and width of the road. (An example of the road network map 1 is shown in FIG. 6) On the contrary, the housing map 2 may be depicted by means of planar and rectilinear coordinate system on the reduction scale of such as 1:2500, which is known as a large-scale map. The housing map 2 may represent in detail building information such as profiles of buildings, names, resident information, etc. (An example of road information of the housing map is shown in FIG. 7)

Figure 8:
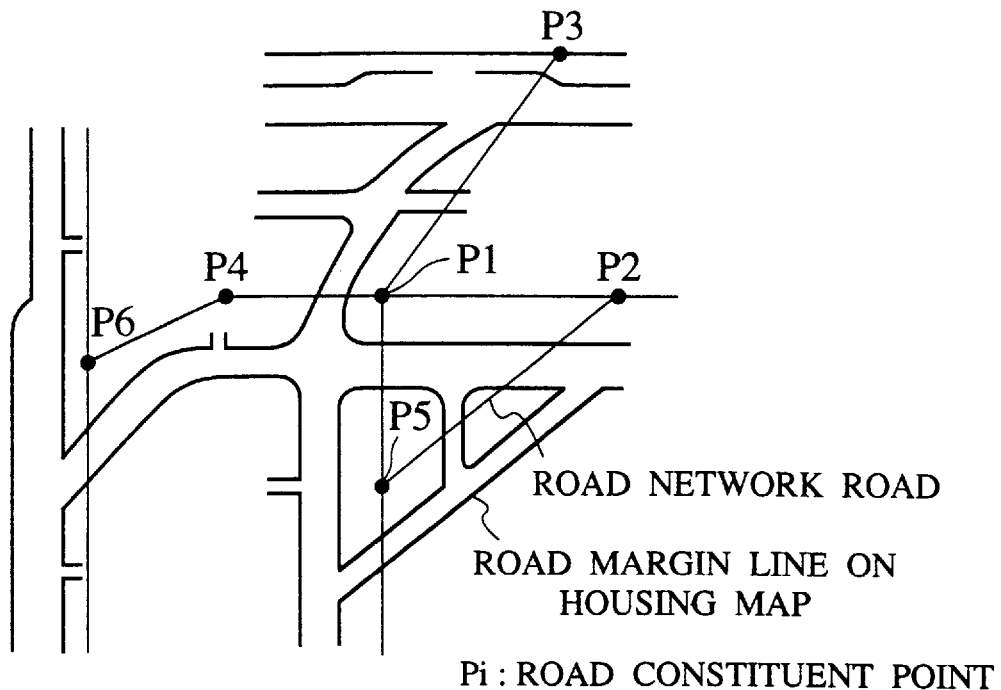
FIG. 8 is a fragmental enlarged view illustrating an example wherein roads in the road network map and road margin lines in the housing map have been superposed in terms of coordinate transformation.

The map processing apparatus 3 may receive information of the road network map 1 and the housing map 2. The coordinate transforming section 31 may execute geometric transformation between the road network map 1 and the housing map 2 to absorb differences in reduction scale and coordinate system as much as possible. More particularly, the road network map 1 depicted by the project considering roundness of the earth may be converted by planar approximation, and then superposed on the housing map 2 by reduction scale transformation and parallel displacement to execute origin consistence. In FIG. 8, an example is shown wherein the roads in the road network map and the road margin lines in the housing map 3 may be superposed in terms of coordinate transformation.

In turn, information in the road network map 1 and the housing map 2 to which geometric transformation has been executed in the coordinate transforming section 31 may be input into the road constituent point correlating section 32.

Figure 2:
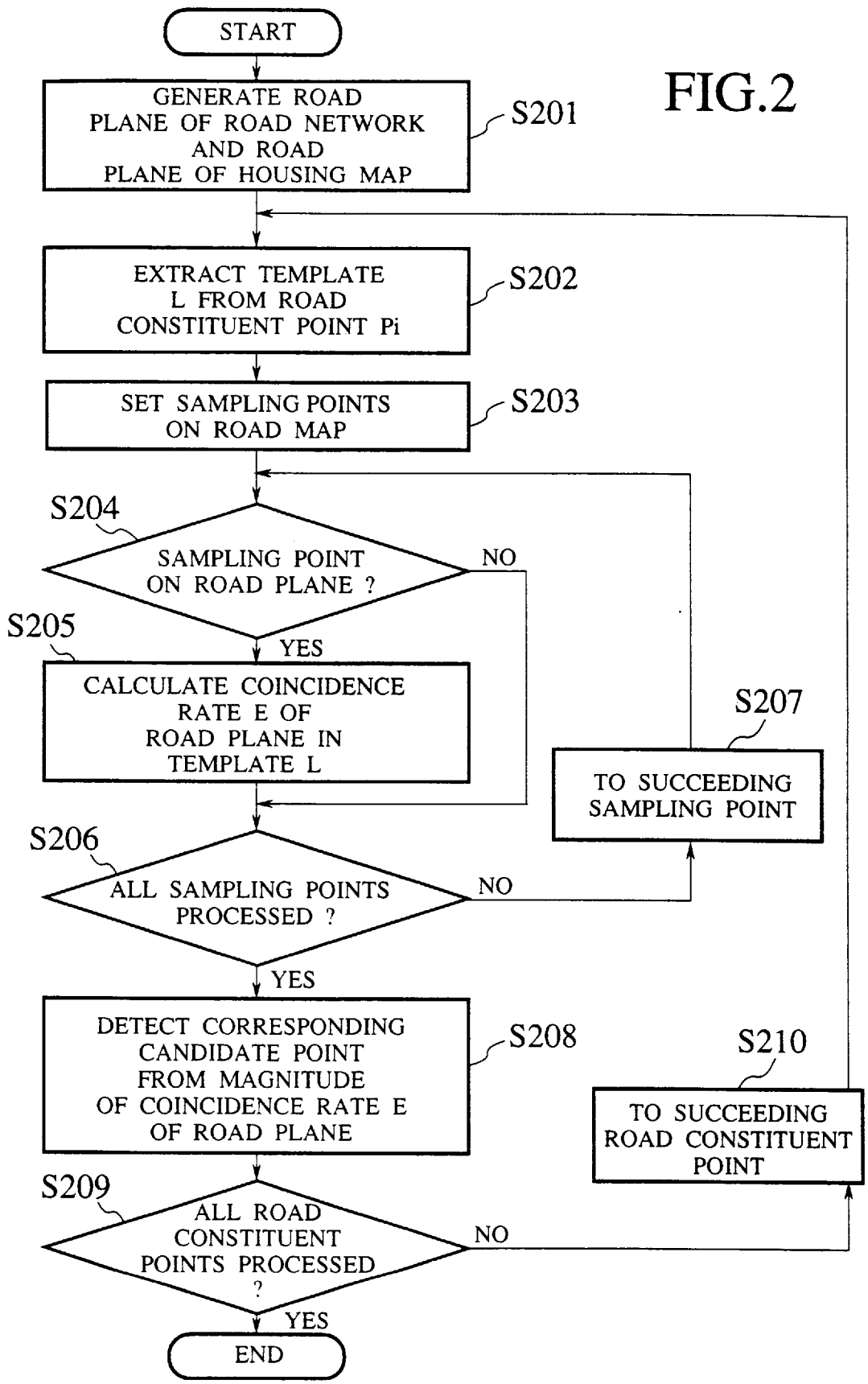
FIG. 2 is a flowchart illustrating process procedures of a corresponding candidate detecting section in FIG. 1.

Subsequently, process procedures of the corresponding candidate detecting section 33 in the road constituent point correlating section 32 will be explained with reference to FIG. 2.

First, a road plane image of the road network may be generated from information of location, width, and connection relation of the road constituent points of respective roads in the road network map 1. A road plane image of the housing map may also be generated by painting out the road planes between road margin lines of the housing map 2 (step 201). The way of generating the road plane image of the housing map will be described later in the case that information of the road margin lines of the housing map 2 comprise disconnected information.

Figure 9:
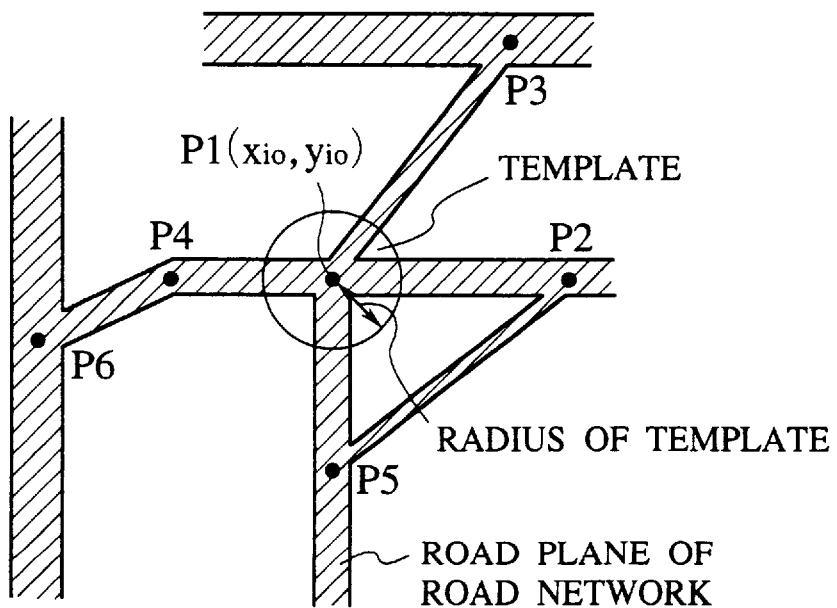
FIG. 9 is a fragmental enlarged view illustrating a template extracted on an image of road planes in the road network map.
Figure 10:
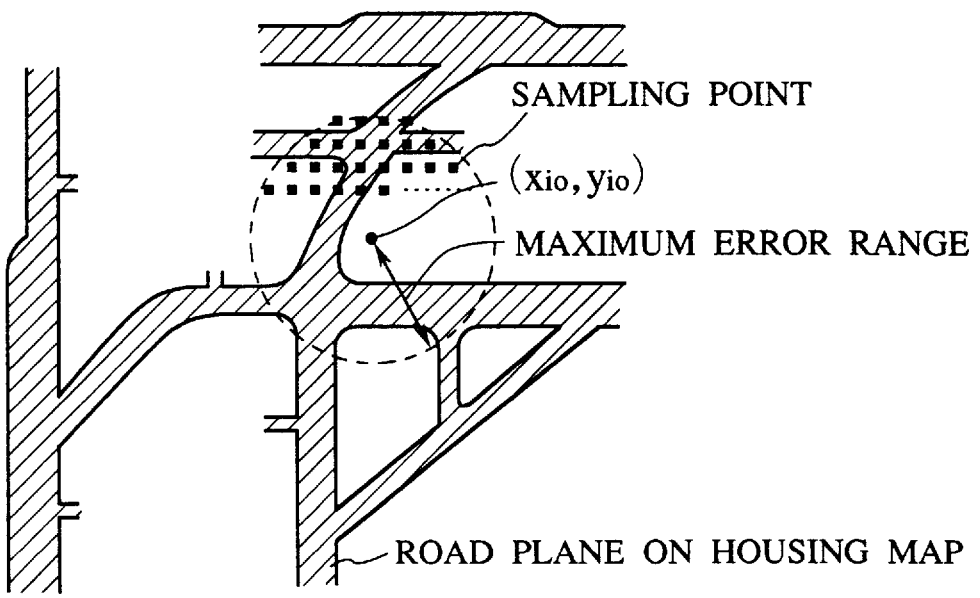
FIG. 10 is a fragmental enlarged view illustrating setting process of sampling points on an image of road planes in the housing map.

Then, as for a road constituent point Pi (i=1 to number of the constituent point) on the coordinate ($x_{i0}$, $y_{i0}$), a circle of a radius r as Pi with the center may be extracted as a template L from the road plane image of the road network, as shown in FIG. 9 (step 202). While sampling points may be set near a point on the coordinate ($x_{i0}$, $y_{i0}$) on the road plane image of the housing map (step 203). As shown in FIG. 10, sampling points may be set on lattice-like points having a suitable distance in a circle of a radius D as a point on the coordinate ($x_{i0}$, $y_{i0}$) with the center if a maximum error range estimated based on location precision between both maps is D. All sampling points may be checked whether or not the sampling point is the road on the road plane image of the housing (step 204). As a result, if the sampling point is on the road, the sampling point may be superposed on a center point of the template L, and then a correspondence rate E between the road on the road plane image of the road network and the road on the road plane image of the housing map may be calculated (step 105). More particularly, the correspondence rate E may be calculated by dividing the pixel number of the corresponding road plane between the road on the road plane image of the road network and the road on the road plane image of the housing map by all pixel numbers of the road plane on the road plane image of the road network within the template L. As the result of the decision in step 204, unless the sampling point is the road, then the process may skip over step 205 and advance to step 206.

Instep 206, it is determined whether or not all sampling points have been processed. If there still remain unprocessed sampling points, then processes in step 204 and step 205 may be repeated as for succeeding sampling point (step 207). On the contrary, if all sampling points have been processed, then the correspondence rate E of all road planes has been calculated as to the sampling points on the road plane on the road plane image of the housing map. Then, N sampling points may be selected based on each calculated correspondence rate E in the order of larger value of the rate E, and then be set as corresponding candidate points in that order (step 208). At this time, if a lower limit value of the correspondence rate E is provided, then the case wherein corresponding candidate points are less than N may be acceptable.

In step 209, it may be determined whether or not all road constituent points have been processed. In case unprocessed road constituent points still remain, then the processes in step 202 to step 208 may be repeated with respect to a succeeding road constituent point (step 210). Conversely, if all road constituent points have been processed, then a course of process may be terminated.

The situation would be supposed wherein the maximum correspondence rate E will be obtained reluctantly on the sampling point farther away from the point on the coordinate ($x_{i0}$, $Y_{i0}$). Therefore, with employing a distance from the point on the coordinate ($x_{i0}$, $Y_{i0}$) to the sampling point as a parameter, such a weighting scheme can be used that the nearer the distance from the point on the coordinate ($x_{i0}$, $y_{i0}$) the more the correspondence rate E.

FIG. 3 shows data of corresponding candidate points derived from the above processes.

Figure 4:
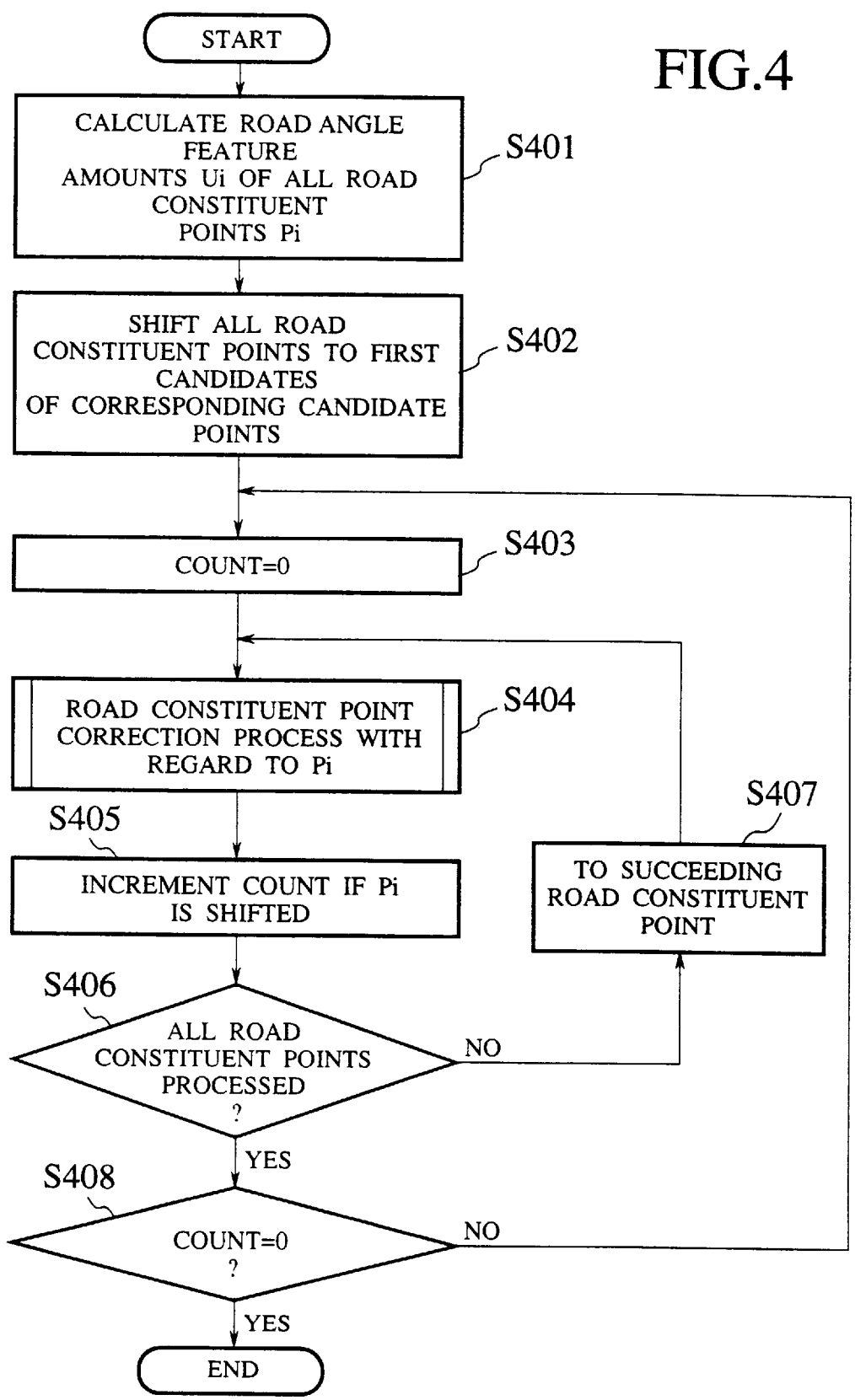
FIG. 4 is a flowchart illustrating process procedures of a correspondence determining section in FIG. 1.

Next, processes in the correspondence determining section 34 will be explained with reference to FIG. 4 hereinbelow.

Figure 11:
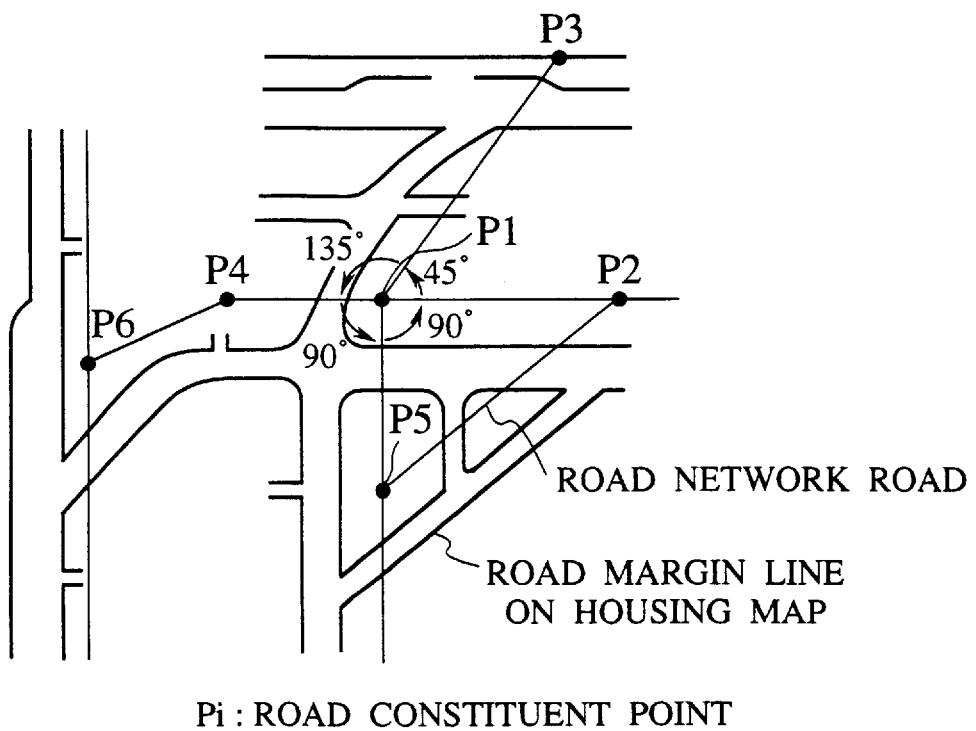
FIG. 11 is a fragmental enlarged view illustrating road angle feature amounts in the road network map.

First, for respective road constituent points Pi, a road angle feature amount Ui indicating intersecting angles between the roads as illustrated in FIG. 11 may be calculated preliminarily (step 401). In an example in FIG. 11, following multi-dimensional data may be obtained.

$$
\begin{array}{cccccc}
U1 & U2 & U3 & U4 & U5 & U6 \\
\begin{pmatrix}45\\135\\90\\90\end{pmatrix} & \begin{pmatrix}180\\40\\140\\0\end{pmatrix} & \begin{pmatrix}180\\45\\135\\0\end{pmatrix} & \begin{pmatrix}210\\150\\0\\0\end{pmatrix} & \begin{pmatrix}50\\180\\180\\0\end{pmatrix} & \begin{pmatrix}60\\180\\120\\0\end{pmatrix} \cdots
\end{array}
$$

Subsequently, all road constituent points may be shifted to their own first candidate points (step 402) to thus result in an initial state. In other words, a counter COUNT for counting the shift number for respective road constituent points Pi may be initialized (step 403).

Figure 12:
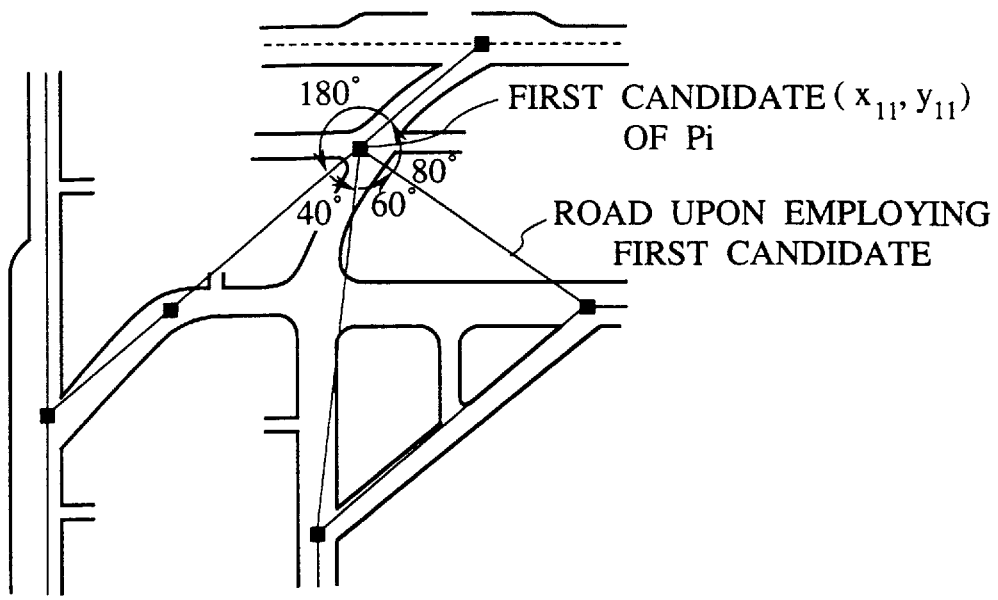
FIG. 12 is a fragmental enlarged view illustrating a situation wherein all road constituent points have been shifted to their first candidate points.

In FIG. 12, an initial state may be indicated by the solid line wherein all road constituent points have been shifted to their first candidate points of the corresponding candidate points in the example in FIG. 11.

Figure 5:
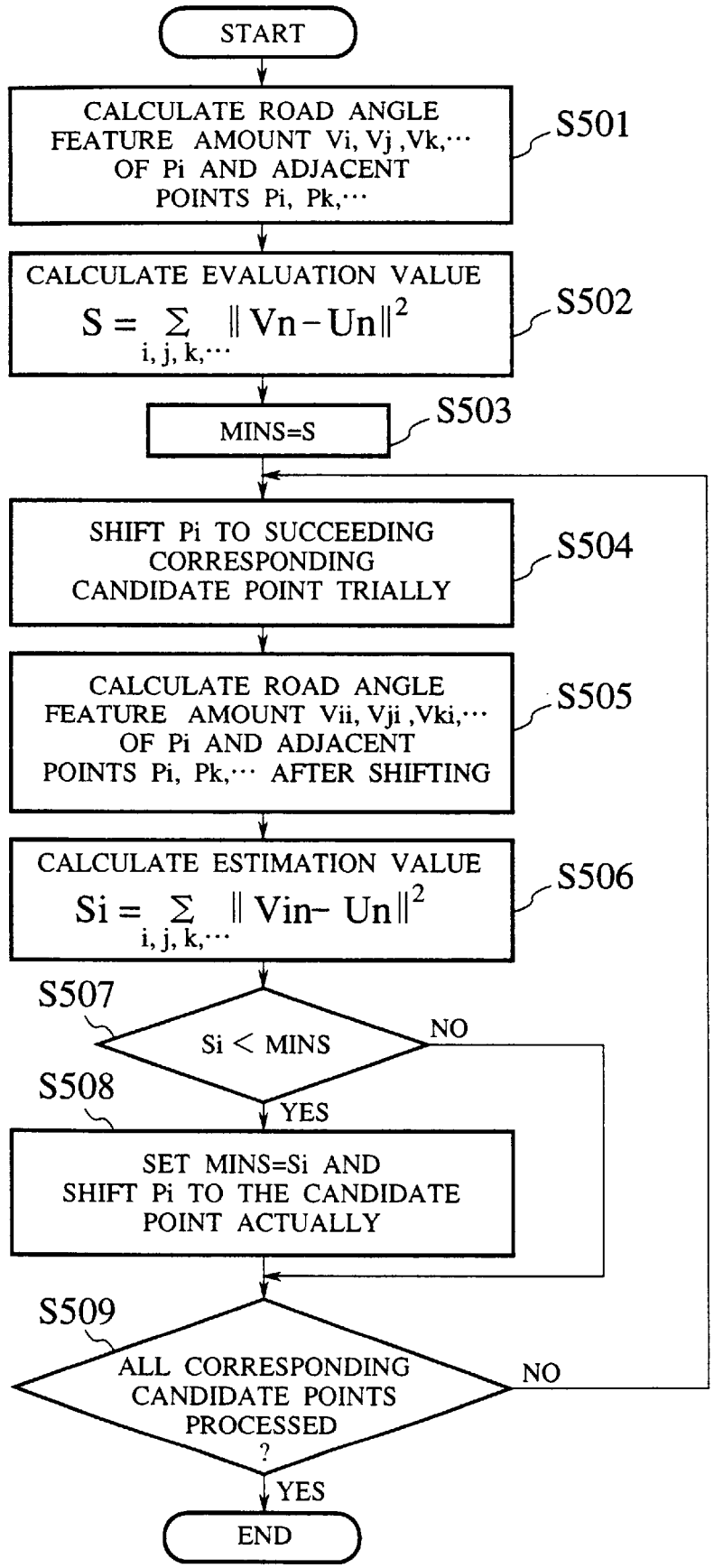
FIG. 5 is a flowchart illustrating procedures in road constituent point correction process.

For the road constituent points Pi, road constituent point correction process may be executed (step 404). FIG. 5 is a flowchart illustrating detailed process procedures in road constituent point correction process. The process will be explained with reference to FIG. 5 hereinbelow.

First, in the initial state, road angle feature amounts Vi, Vj, Vk, . . . corresponding to the points Pi, Pj, Pk, . . . may be calculated (step 501). In an example in FIG. 12, the amounts are as follows.

$$
\begin{array}{ccccc}
V1 & V2 & V3 & V4 & V5 \\
\begin{pmatrix}80\\180\\40\\60\end{pmatrix} & \begin{pmatrix}140\\80\\140\\0\end{pmatrix} & \begin{pmatrix}180\\45\\140\\0\end{pmatrix} & \begin{pmatrix}180\\180\\0\\0\end{pmatrix} & \begin{pmatrix}40\\190\\130\\0\end{pmatrix} \cdots
\end{array}
$$

Then, an evaluation value S representing a difference amount from original road angle feature amounts Ui, Uj, Uk, . . . may be calculated according to the following equation (step 502).

$$S=\|Vi-Ui\|^2+\mu\|Vj-Uj\|^2+\mu\|Vk-Uk\|^2+\ldots$$

In particular, the following is the calculation in the example shown in FIG. 12.

$$
\begin{aligned}
S &= (80-45)^2 + (180-135)^2 + (40-90)^2 + (60-90)^2 + \\
&\quad (140-180)^2 + (80-40)^2 + (140-140)^2 + (0-0)^2 + \\
&\quad (180-180)^2 + (40-45)^2 + (140-135)^2 + (0-0)^2 + \\
&\quad (180-210)^2 + (180-150)^2 + (0-0)^2 + (0-0)^2 + \\
&\quad (40-50)^2 + (190-180)^2 + (130-130)^2 + (0-0)^2 \\
&= 11900
\end{aligned}
$$

The evaluation value S may then be substituted into the minimum evaluation value MINS (step 503).

The road constituent point Pi will then be shifted to the succeeding corresponding candidate point by way of trial (step 504).

Figure 13:
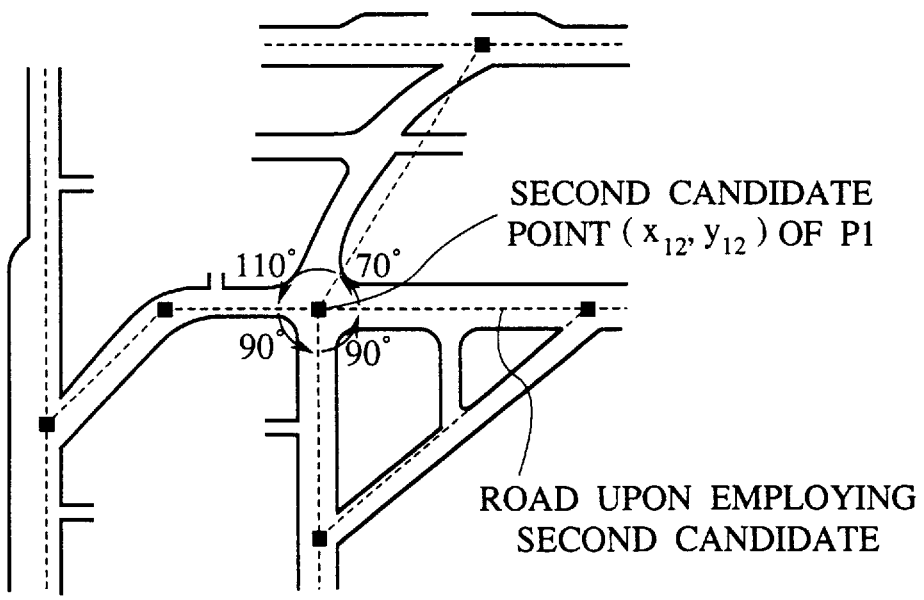
FIG. 13 is a fragmental enlarged view illustrating a situation wherein a road constituent point Pi has been shifted to its second candidate point of all corresponding candidate points.

In FIG. 13, a situation may be indicated by the wave line wherein the point Pi has been shifted to its second candidate point of the corresponding candidate points.

After the point Pi has been shifted, the road angle feature amounts Vii, Vji, Vki, . . . corresponding to the points Pi, Pj, Pk, . . . may be calculated (step 506). The following is the value in the example shown in FIG. 13.

$$
\begin{array}{ccccc}
V1i & V2i & V3i & V4i & V5i \\
\begin{pmatrix}70\\110\\90\\90\end{pmatrix} & \begin{pmatrix}180\\40\\140\\0\end{pmatrix} & \begin{pmatrix}180\\70\\110\\0\end{pmatrix} & \begin{pmatrix}220\\140\\0\\0\end{pmatrix} & \begin{pmatrix}50\\180\\130\\0\end{pmatrix} \cdots
\end{array}
$$

Like the first corresponding candidate points, an evaluation value Si representing difference amount from original road angle feature amounts Ui, Uj, Uk, . . . may be calculated (step 506).

The following is the particular calculation in the example shown in FIG. 13.

$$
\begin{aligned}
Si &= (70-45)^2 + (110-135)^2 + (90-90)^2 + (90-90)^2 + \\
&\quad (180-180)^2 + (40-40)^2 + (140-140)^2 + (0-0)^2 + \\
&\quad (180-180)^2 + (70-45)^2 + (110-135)^2 + (0-0)^2 + \\
&\quad (220-210)^2 + (140-150)^2 + (0-0)^2 + (0-0)^2 + \\
&\quad (50-50)^2 + (180-180)^2 + (130-130)^2 + (0-0)^2 \\
&= 2700
\end{aligned}
$$

It may then be determined whether or not the evaluation value Si is less than the minimum evaluation value MINS (step 507). If the evaluation value Si is less than the minimum evaluation value MINS, then the evaluation value Si may be set to the new minimum evaluation value MINS by substituting the evaluation value Si into the minimum evaluation value MINS. In addition, the road constituent point Pi may be actually shifted to the candidate point (step 508). On the other hand, unless the evaluation value Si is less than the minimum evaluation value MINS, then the process may advance to step 509 as it is.

In step 509, it may be determined whether or not the processes from step 504 to step 508 have been executed with respect to all candidate points of the road constituent point Pi. Unless the processes have been executed with respect to all candidate points, then the process may return to step 504 to continue the process. On the contrary, if the processes have been executed with respect to all road candidate points, then a course of the above road constituent point correction processes may be ended.

Returning to FIG. 4, in case the road constituent point Pi has been actually shifted once at least in the above road constituent point correction process, then the counter COUNT may be incremented (step 405).

It may in turn be determined whether or not the road constituent point correction process in step 404 and the process in step 405 have been executed with respect to all road constituent points. Unless the processes have been executed with respect to all road constituent points, then the processes in step 404 and in step 405 may be repeated with respect to a succeeding road constituent point.

Conversely, if the processes have been executed with respect to all road constituent points, then it may be checked whether or not the counter COUNT remains in a "0" state (step 408). In other words, in the course of the processes from step 404 to step 407, i.e., during the processes for effecting the road constituent point correction process with respect to all road constituent points, it may be determined whether or not none of all road constituent points has been actually shifted to other candidate point. If none of all road constituent points has been actually shifted to other candidate point, then the process may be terminated since such situation would seem to indicate the optimum coincidence of the roads between the road network map and the housing map. While, if the counter COUNT has not been in a "0" state, i.e., if at least one of all road constituent points has been actually shifted, then the processes from step 403 to step 407, i.e., the processes for effecting the road constituent point correction process with respect to all road constituent points may be repeated from that location of the road constituent point at that stage.

According to the processes from step 403 to step 408, the optimum corresponding candidate points of respective road constituent points, which being optimum in conjunction with other road constituent points, have been calculated.

When determining whether or not the road constituent point should be shifted to the corresponding candidate point, the magnitude of the correspondence rate E of the road planes at that point may further be considered in addition to the comparison between the evaluation value Si and the minimum evaluation value MINS in step 507.

With the foregoing processes, the road on the road network map and the road on the housing map may in general be correlated. However, there is the case wherein accidental coincidence may occur if only the foregoing processes are employed. Therefore, to achieve the more precise coincidence, following processes may be effected.

There are two ways for improving the coincidence precision.

Figure 14A:
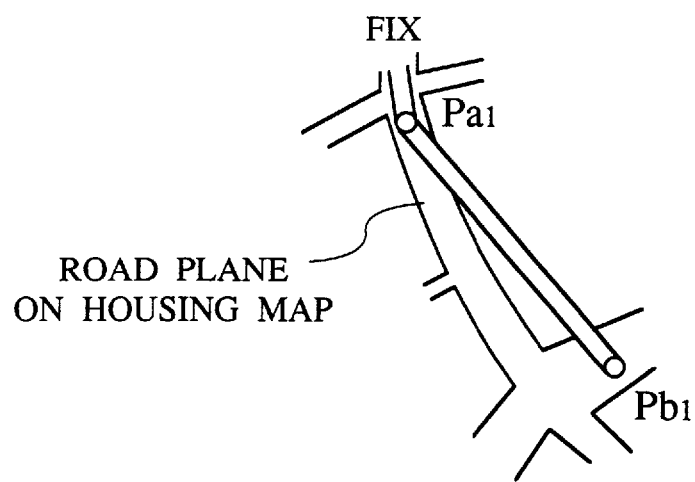
FIGS. 14A and 14B are fragmental enlarged views illustrating first process to improve coincidence precision.
Figure 14B:
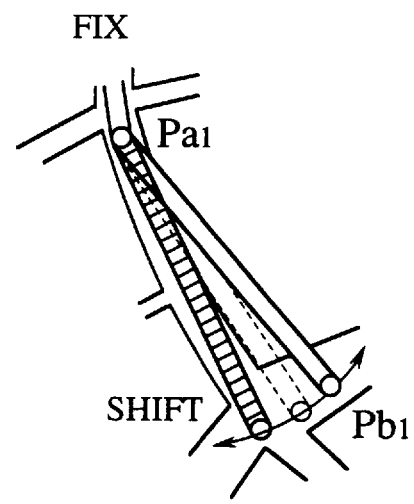

FIGS. 14A and 14B are views for illustrating a first way to improve the coincidence precision. In the first method, following processes may be performed.

First, two adjacent road constituent points Pa and Pb may be selected from road network information. The correspondence rates E of the road planes on the selected road constituent points Pa and Pb are compared with each other, then the road constituent point having larger correspondence rate E of the road planes may be fixed. In FIG. 14A, the point Pa1 may be fixed. With the road constituent point having larger correspondence rate E of the road planes as the center, the road constituent point having smaller correspondence rate E of the road planes may be rotated and shifted to the point where maximum superposition with the road plane on the housing map may be attained, as shown in FIG. 14B. The foregoing processes may be repeated with respect to the road constituent points, for example, which are designated by the operator of the processing apparatus or on which the correspondence rate E of the road planes is less than a predetermined value. According to the above processes, the coincidence precision of the road can be improved.

Figure 15A:
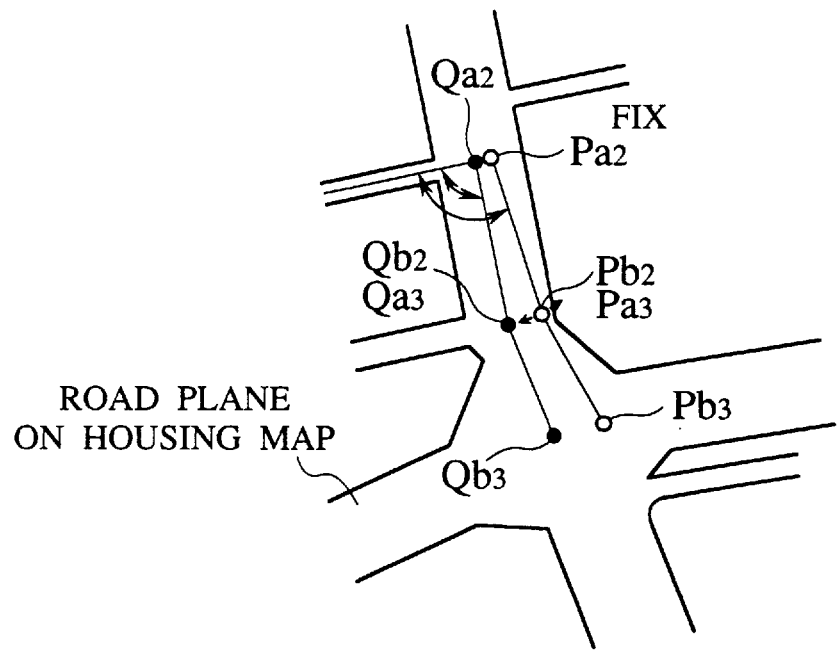
FIGS. 15A and 15B are fragmental enlarged views illustrating second process to improve coincidence precision.
Figure 15B:
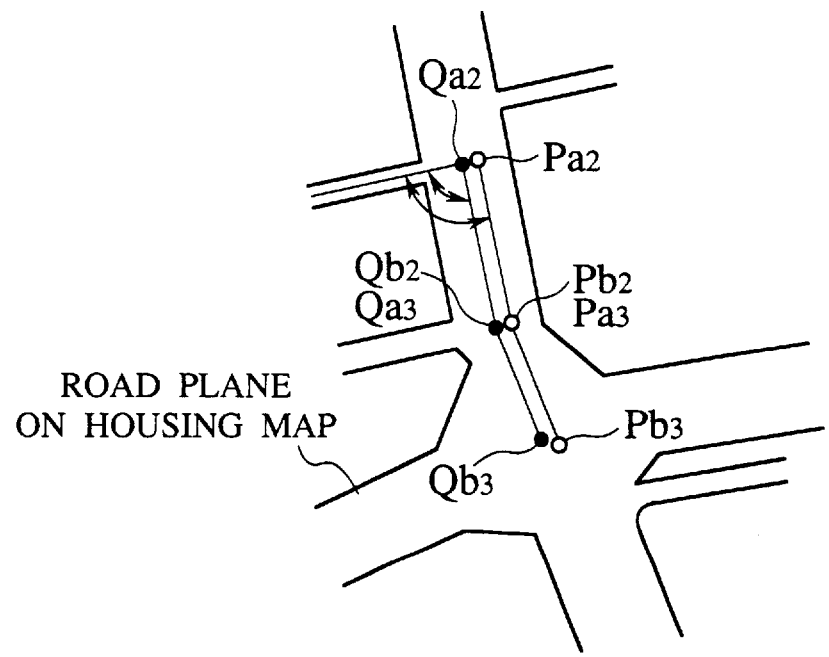

FIGS. 15A and 15B are views for illustrating a second way to improve the coincidence precision. In the second method, following processes may be performed.

First, two adjacent road constituent points Pa and Pb may be selected from road network information. The correspondence rates E of the road planes on the selected road constituent points Pa and Pb are compared with each other, then the road constituent point having larger correspondence rate E of the road planes may be fixed. In FIG. 15A, the point Pa2 may be fixed. With the road constituent point having larger correspondence rate E of the road planes as the center, the road constituent point having smaller correspondence rate E of the road planes may be rotated and shifted such that an angle of the line connecting two attended road constituent points coincides with an angle of the corresponding line connecting center points of the intersecting points of the roads on the housing map. In the example in FIG. 15B, first the road constituent points Pb2 may be shifted while fixing the road constituent points Pa2 such that an angle of the line Pa2–Pb2 coincides with an angle of the corresponding line Qa2–Qb2 connecting center points of the intersecting points of the roads. In addition, while regarding the moved road constituent points Pb2 as the point Pa3 to be fixed, similar processes are effected with respect to the line Pa3–Pb3. The foregoing processes may be repeated with respect to the road constituent points, for example, which are designated by the operator of the processing apparatus or on which the correspondence rate E of the road planes is less than a predetermined value. According to the above processes, the coincidence precision of the road can be improved.

By correlating both road information with each other as above, the integrated map 4 having road network map information correlated to housing map information can be derived finally.

In the event that the integrated map 4 generated by the foregoing method and apparatus is used for navigation, for example, information such as the destination and objectives along the roads and near the crossing on guide routes may be extracted arbitrarily from rich building information on the housing map, thus enabling kind navigation for the user. Since the precision of location information of the road constituent points on the road network has been improved rather than the conventional one, an advantage can be enjoyed sufficiently by the user if the precision of present location detecting means such as GPS can be improved.

As has been stated above, the method and the apparatus of the present invention can utilize a plenty of map information integrally and mutually between different purpose maps including location errors because of their different reduction scales. The example of the map information are housing figure data such as dwelling houses and its attribute information, normal building figure data such as apartments and its attribute information, specific building figure data such as office buildings and its attribute information, railway figure data and its attribute information, water system data such as rivers, ponds, lakes, and dams and its attribute information, road figure data such as general roads and mountain paths which are not shown in a road network map and its attribute information, contour line data and its attribute information, administrative district figure data such as prefecture, city and town and its attribute information, and land figure data showing sections as to land use such as fields.

In addition, a new map may be made by corresponding a plurality of different purpose maps each other. For instance, a road network map which is updated several times a year and an old map which, on one hand, is a high precision map including high precious road figure information and, on the other hand, has not been updated for a long time due to huge manpower are integrated to make a new map which includes the merits of both maps. At this time, a new map which includes only required information may be made by predetermining both required information and non-required information. Though there are some cases where all of the above mentioned various data are required, that is a rare case. Therefore, a map which includes only required information should be able to be made according to use and field of application. In this case, if an operator can select and reject the required information and the non-required information, a reliable map can be certainly made and it is very convenient.

Next, in case information of the road margin lines on the housing map 2 are disconnected information, the way of generating road image of the housing map will be explained. In this embodiment, the road plane may be recognized by inputting road margin information representing road profiles on the map and non-road figure information which do not exist on the road plane.

Figure 16:
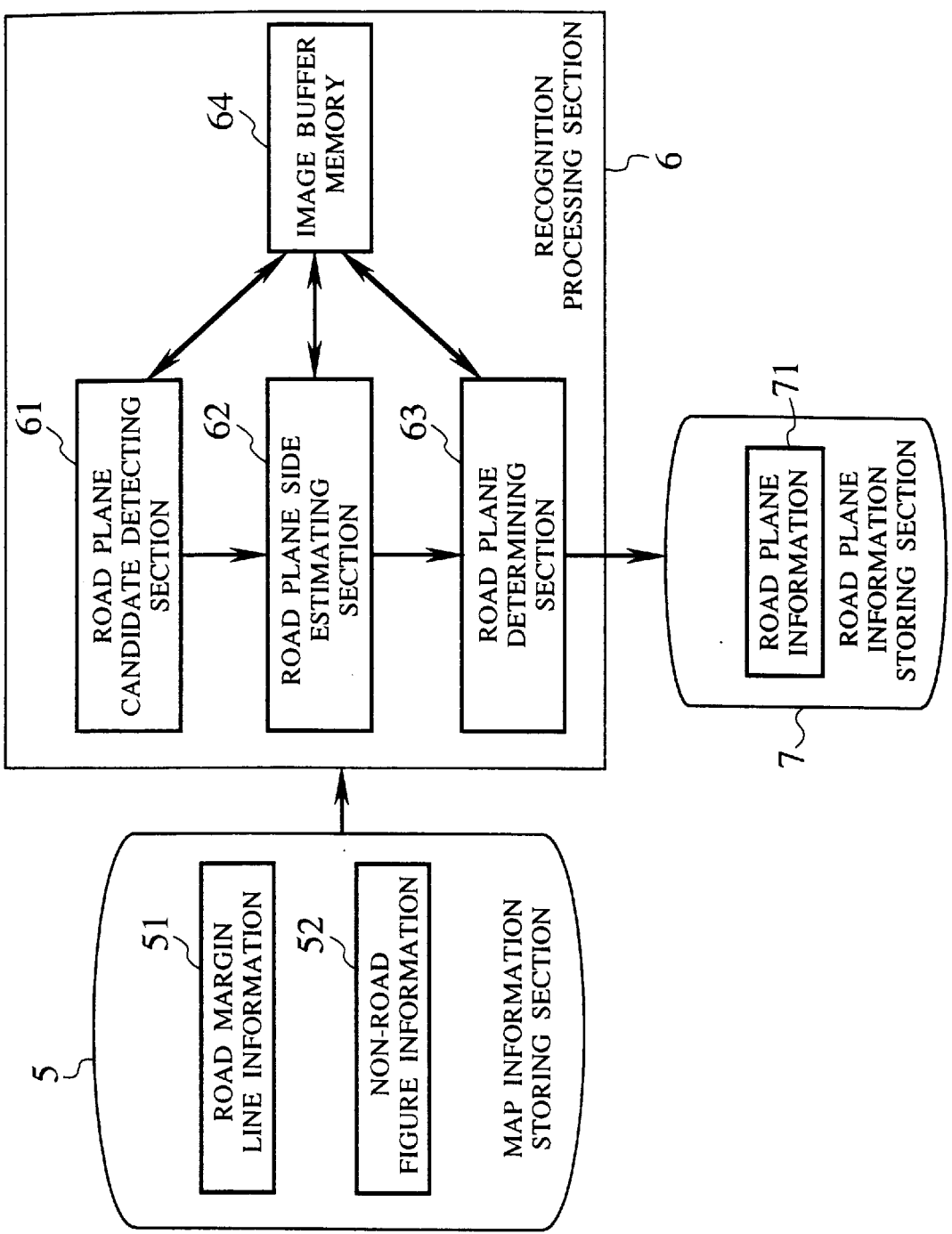
FIG. 16 is a block diagram showing a configuration of an automatic road recognition apparatus according to an embodiment of the present invention.

FIG. 16 is a block diagram showing a configuration of an automatic road recognition apparatus according to an embodiment of the present invention. In FIG. 16, a map information storing section 5 may store road margin line information 51 which are collection of the number of constituent points of the line segments representing the road margins and coordinate rows of the constituent points, and non-road figure information 52 which are collection of the number of constituent points of the figure representing profiles of map elements, which are not present in the road planes obviously such as building figure, water system data, etc., and coordinate rows of the constituent points. A recognition processing section 6 may receive the road margin line information 51 and the non-road figure information 52 to recognize the road planes, and output road plane information 71 to a road plane information storing section 7. The recognition processing section 6 comprises a road plane candidate detecting section 61, a road plane side estimating section 62, a road plane determining section 63, and an image buffer memory 64 used for a working memory.

Next, processes in respective sections of the recognition processing section 6 will be explained in more detail.

Figure 17:
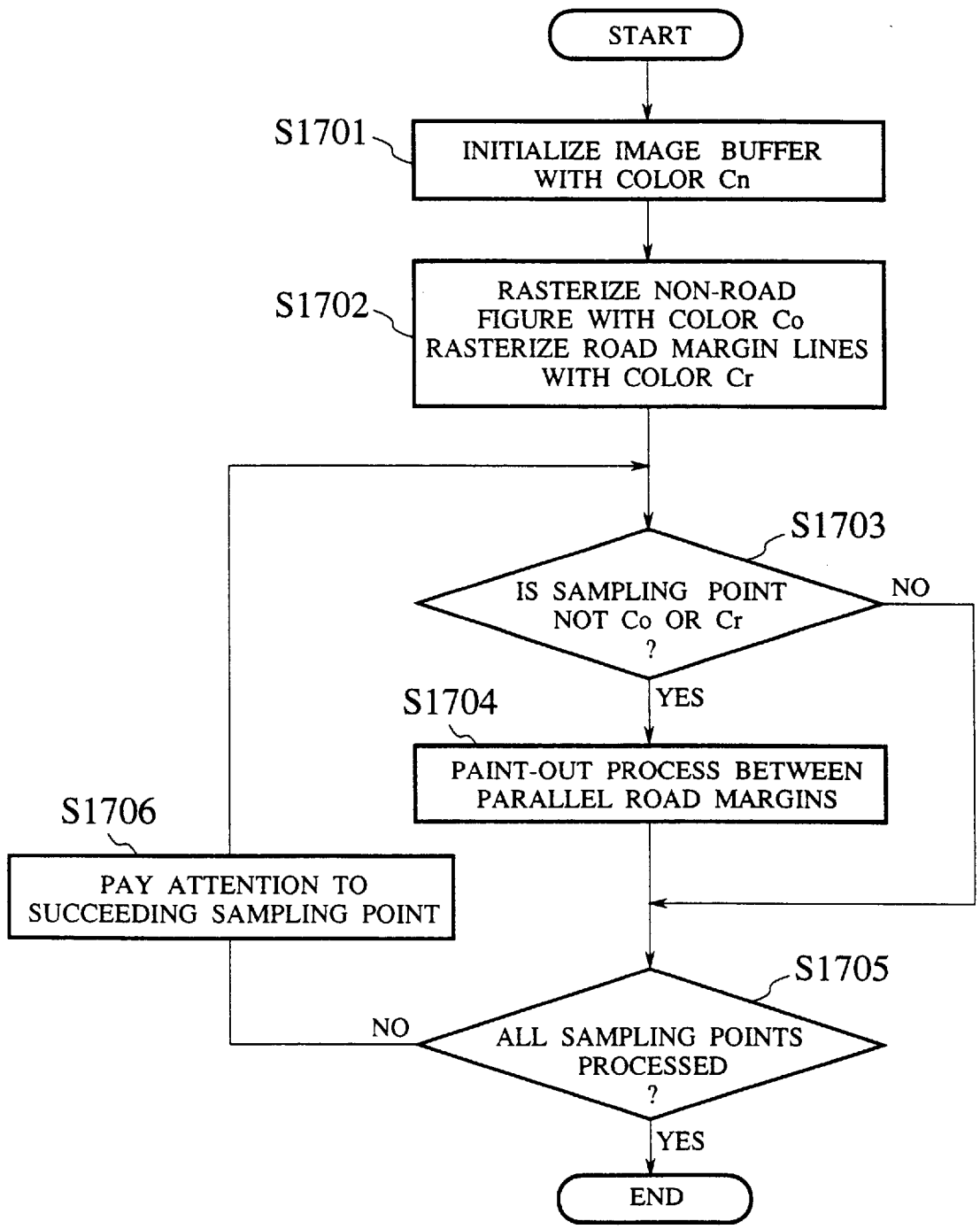
FIG. 17 is a flowchart illustrating process procedures of a road plane candidate detecting section in FIG. 16.

At first, process procedures in the road plane candidate detecting section 61 will be explained with reference to FIG. 17.

Figure 22:
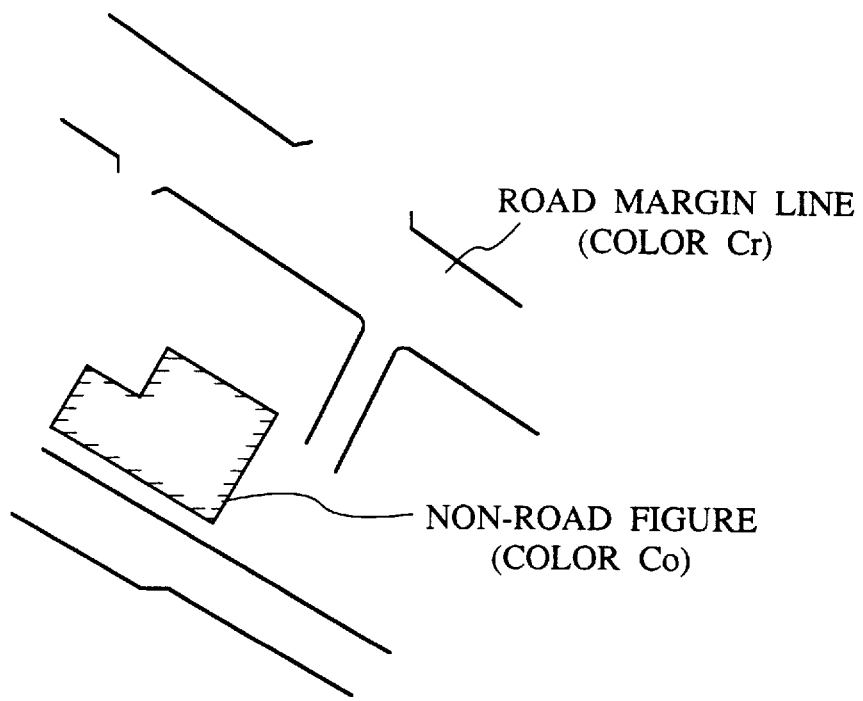
FIG. 22 is a fragmental enlarged view illustrating an example of a rasterized image of non-road figure information and road margin line information.

First the image buffer memory 64 may be initialized with color Cn to develop map information which is objective of road plane recognition process (step 1701). Then non-road figure information 52 which being read from the map information storing section 5 and stored in the image buffer memory 64 are rasterized with color Co. Interiors of the closed figures are painted out with color Co. Subsequently, road margin line information 51 are rasterized with color Cr (step 1702). Resolution in rasterization would be decided to have the value by which a minimum road width to be recognized can be represented separately at a distance more than suitable pixel numbers on the image. FIG. 22 shows rasterized image of road margin line information 51 and non-road figure information 52.

In turn, lattice points are set at a distance on the image buffer memory 64 as sampling points, and following processes are executed with respect to all sampling points. Specifically, it may be determined whether or not color of the attentional sampling point is not Co or Cr (step 1703). If the attentional sampling point is not Co or Cr, then paint-out process for painting the road plane out between parallel road margins may be executed (step 1704). Detailed contents of this paint-out process will be discussed later. On the contrary, if the attentional sampling point is either Co or Cr, the process proceeds to step 1705 without effecting this paint-out process. In step 1705, it may be determined whether or not the process has been completed for all sampling points. Unless the process has been completed for all sampling points, then attention may be paid to succeeding sampling point (step 1706), and the process returns to step 1703 to repeat the process. Conversely, if the process has been completed for all sampling points, a series of processes have been terminated.

Figure 18:
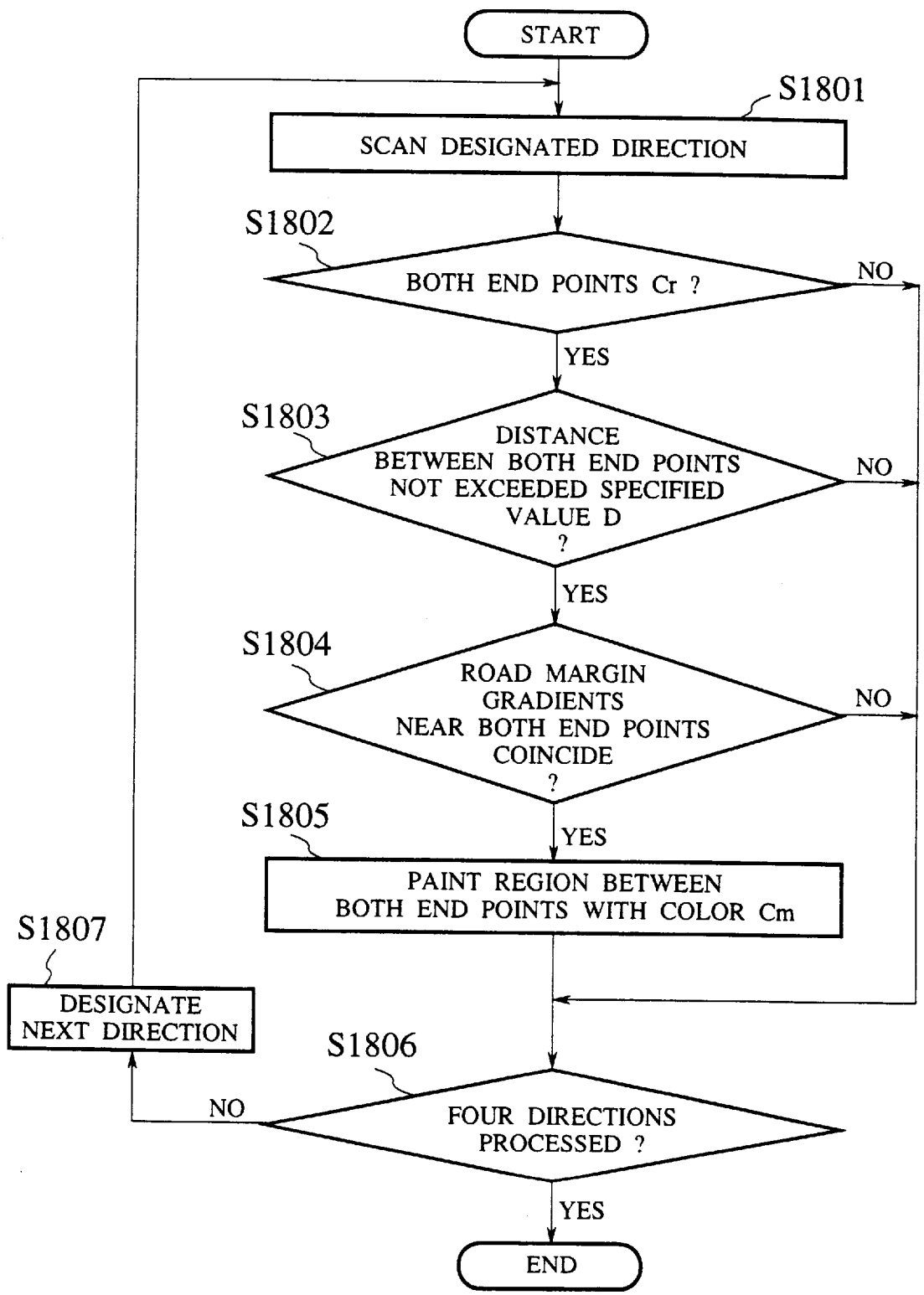
FIG. 18 is a flowchart illustrating procedures in paint-out process for painting road plane out between parallel road margins.

Then, the paint-out process for painting the road plane out between parallel road margins will be explained hereinbelow with reference to FIG. 18. This process is in summary such that scanning may be made from the sampling point to reach the Co or Cr color point in the forward/backward directions of four directions (i.e., 0 degree, 45 degree, 90 degree, and 135 degree), and, if predetermine conditions are satisfied, then it may be determined as the parallel road margins to then paint the area located between both end points with color Cm. Details will be given in the following.

First, scanning may be executed from the attentional sampling point in the forward/backward directions of one of four directions (step 1801). When reaching to the end point, it may be determined whether or not the point is colored with Cr color (step 1802). Unless the point has been colored with Cr color, then the step may jump to step 1806 while, if the point has been colored with Cr color, then it may be determined whether or not the distance between both end points is in excess of a specified value D (step 1803). The specified value D has been set in advance to $\sqrt{2}$ times as large as a maximum road width. If the distance has been in excess of the specified value D, then the process may jump to step 1806, and on the contrary unless the distance has been in excess of the specified value D, then it may be determined whether or not gradients of the road margin lines near both end points are equal to each other (step 1804).

The gradients of the road margin lines may be obtained, for example, by quantizing in four directions as follows. Following gradient detection operators per direction must be affected to the point which being colored with Cr color within a 5×5 pixel range with the attentional point to be calculated as the center, so that a resultant gradient corresponding to the operator having the largest result of product-sum operation may be set as the gradient at that point.

| 0 degree | 45 degree | 90 degree | 135 degree |
|---|---|---|---|
| −1, −1, −1, −1, −1 | 0, −1, −1, 0, 2 | −1, 0, 2, 0, −1 | 2, 0, −1, −1, 0 |
| 0, 0, 0, 0, 0 | −1, −1, 0, 2, 0 | −1, 0, 2, 0, −1 | 0, 2, 0, −1, −1 |
| 2, 2, 2, 2, 2 | −1, 0, 2, 0, −1 | −1, 0, 2, 0, −1 | −1, 0, 2, 0, −1 |
| 0, 0, 0, 0, 0 | 2, 0, −1, −1, 0 | −1, 0, 2, 0, −1 | −1, −1, 0, 2, 0 |
| −1, −1, −1, −1, −1 | 2, 0, −1, −1, 0 | −1, 0, 2, 0, −1 | 0, −1, −1, 0, 2 |

According to this process, unless the gradients of the road margin lines near both end points have been equal to each other, then the process may directly advance to step 1806. While if gradients of the road margin lines have been equal to each other, the region between both end points may be painted with color Cm (step 1805) and then the process may proceeds to step 1806. In step 1806, it is determined whether or not the process has been executed for four directions. If No, then next direction may be designated (step 1807), and the process may return to step 1801 to repeat the processes. On the other hand, if YES, then a series of processes may be terminated. With the aforementioned processes, the regions being put between road margin lines which can be regarded locally as parallel lines may be detected as road plane candidates.

Figure 23:
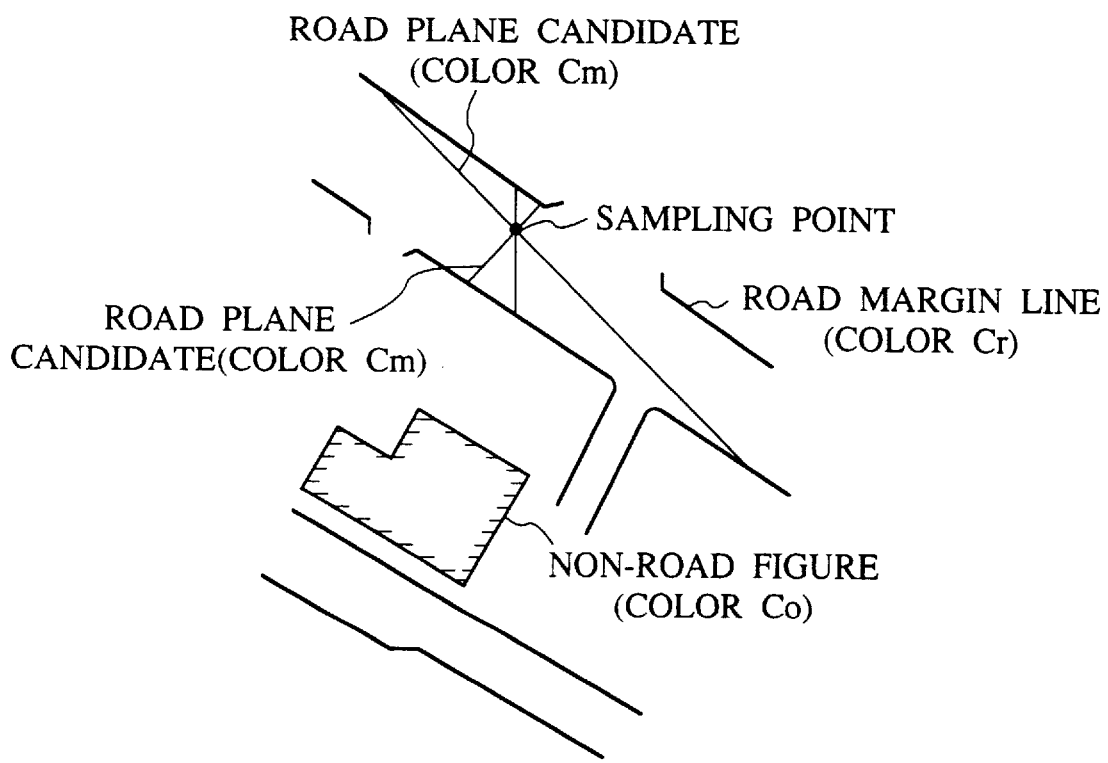
FIG. 23 is a fragmental enlarged view illustrating an example of a image wherein road plane candidates have been detected with respect to one sampling point.
Figure 24:
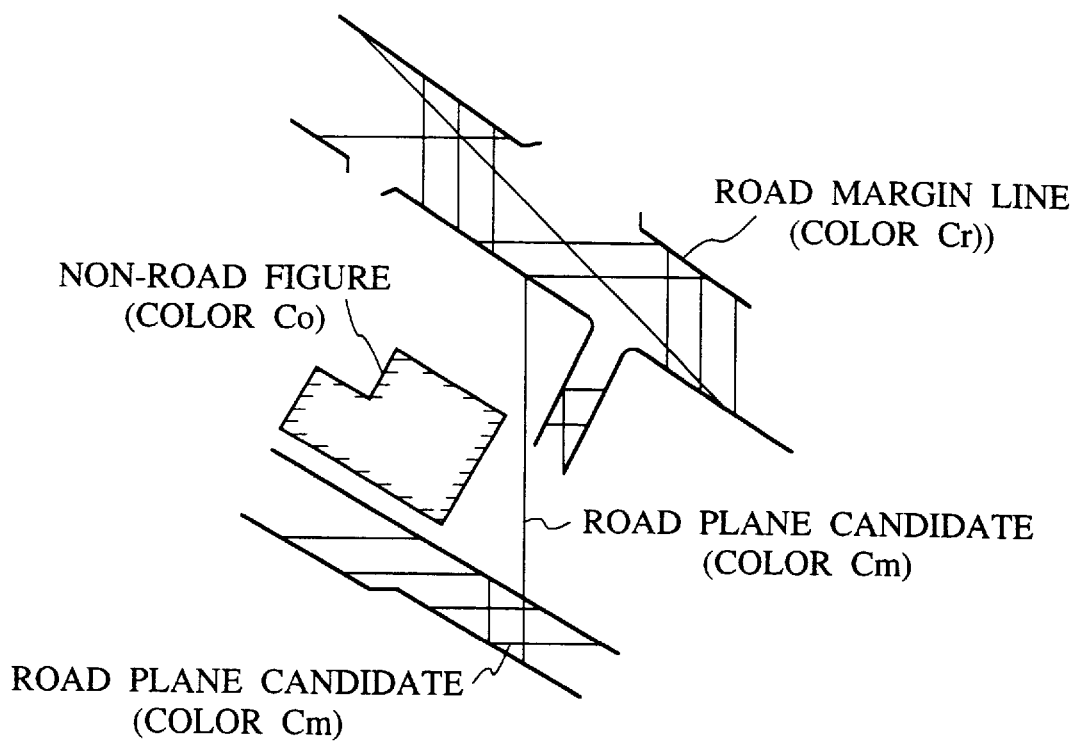
FIG. 24 is a fragmental enlarged view illustrating an example of a image wherein all road plane candidates have been detected.

FIG. 23 shows an example of a detected image as the road plane candidates of one sampling point on the image shown in FIG. 22. FIG. 24 shows an example of detected images of all road plane candidates of one sampling point on the image shown in FIG. 22.

Figure 19:
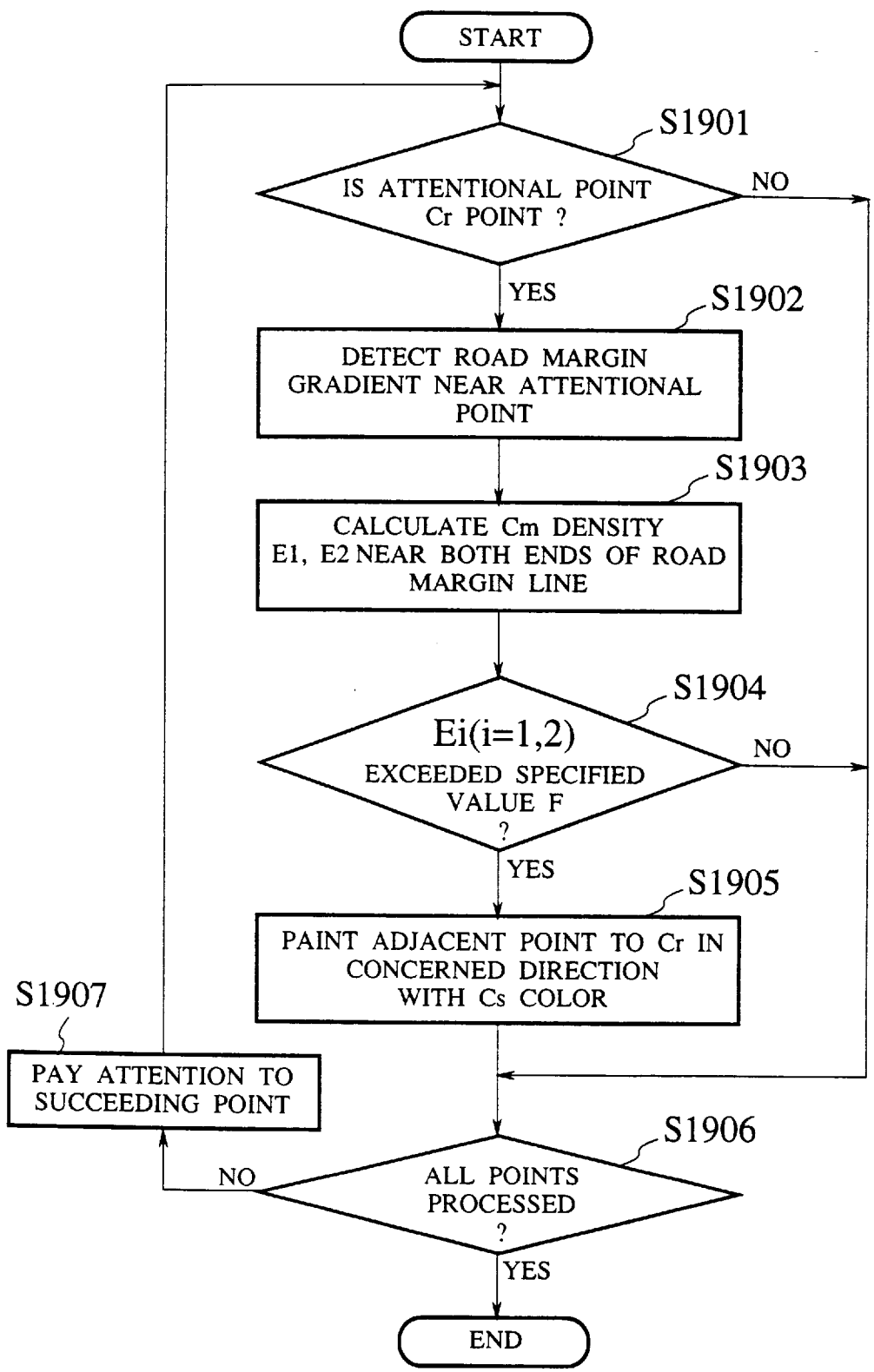
FIG. 19 is a flowchart illustrating process procedures of a road plane side estimating section in FIG. 16.

Referring to FIG. 19, process procedures in the road plane side estimating section 62 will be explained.

This process is in summary such a process that a possibility which side is the road may be estimated by calculating density of Cm color on both sides of the attentional road margin line. The details will be given in the following.

First, it may be decided whether or not the attentional point is colored with Cr color (step 1901). Unless the attentional point is colored with Cr color, then the process may directly proceeds to step 1906. Conversely, if the attentional point is colored with Cr color, then gradients of the road margin lines near that point may be detected (step 1902). In turn, density E1, E2 of Cm color on the neighboring on both sides of the road margin line may be calculated (step 1903). By way of example, when the gradient is 135 degree, density E1, E2 of the Cm color point in specified neighboring regions R1, R2 in the perpendicular directions, i.e., 45 degree and −45 degree direction, may be calculated. As the specified neighboring regions R1, R2, rectangle, etc. having a size which being formed along respective gradient road margin lines and included substantially within the road plane may be defined preliminarily.

In the next, it may be determined whether or not density E1, E2 are more than the specified value F (step 1904). At that time, it would be supposed that either of density E1, E2 has exceeded the specified value F, but if NO, then the process moves directly to step 1906. Conversely, if either or both of density E1, E2 have been more than the specified value F, then the side including the exceeding region may be estimated to have higher possibility of the road plane side, and then the attentional point and one point other than the Cr colored point adjacent to the attentional point on the same side may be colored with Cs color (step 1905). The specified value F has been decided preliminarily as an appropriate value according to a sampling interval and sizes of the regions R1, R2 when detecting road plane candidates. In step 1906, it may be checked whether or not all the points on the image buffer 64 have been processed. If it had been checked that all the points have not always been processed, then succeeding point may be checked (step 1907), and then the process may returns to step 1901 to repeat the process.

On the contrary, if it had been checked that all the points have been processed, then a course of processes may be terminated.

If the Co colored point resides in the specified neighboring regions R1, R2, i.e., if it has been decided that non-roads such as buildings reside in the specified neighboring regions R1, R2, it may be immediately decided that it is not on the road side.

Figure 25:
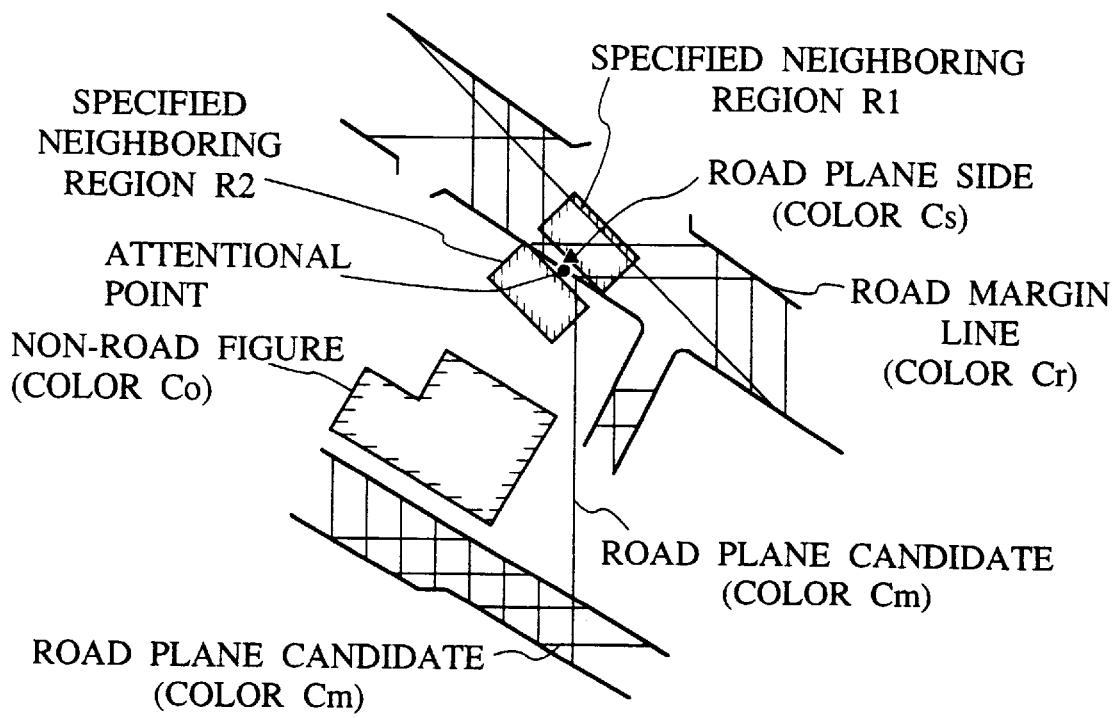
FIG. 25 is a fragmental enlarged view illustrating estimation process for estimating road plane side.
Figure 26:
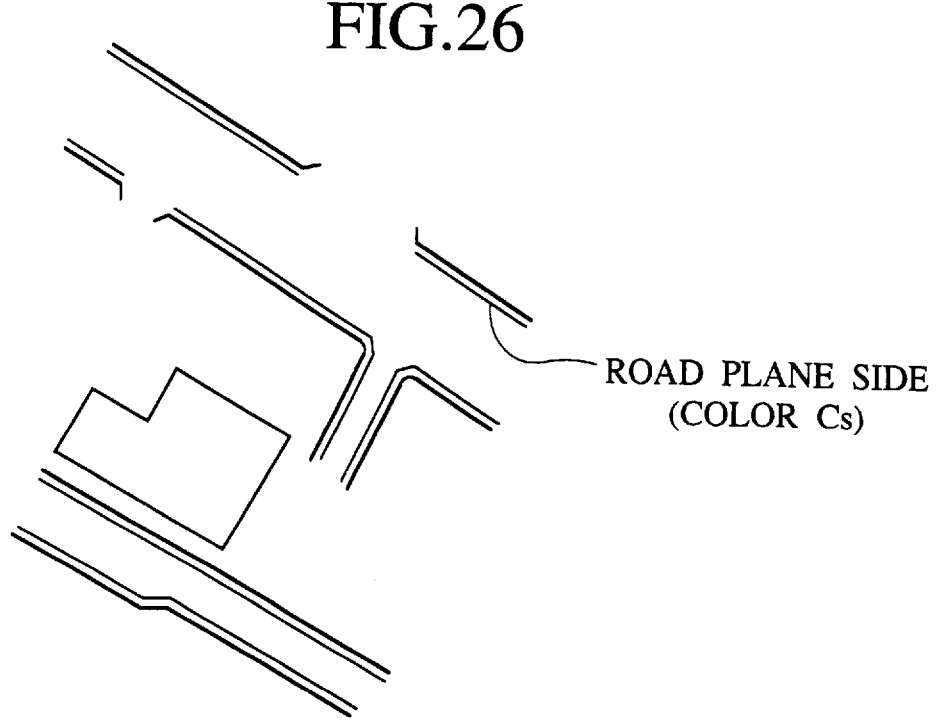
FIG. 26 is a fragmental enlarged view illustrating an example of a image wherein all road plane sides have been estimated.

FIG. 25 shows an example of the specified neighboring regions R1, R2, and an example of a point estimated as the road plane side and colored with Cs color with respect to one attentional point on the road margin line on the image shown in FIG. 24. FIG. 26 shows an example of all image estimated as all road plane side on the image shown in FIG. 24.

Finally, according to FIGS. 20 and 21, process procedures in the road plane determining section 62 will be explained.

This process is in brief such a process that, if a distance obtained by scanning from the Cs colored point to the other Cs colored point is less than a predetermined value, then the distance between these points may be considered as the road plane to thus be painted by predetermined color, and the portions being not painted and caused at the crossing, etc. may be painted, and finally clearances between the road margins may be buried. The details will be in the following.

Figure 20:
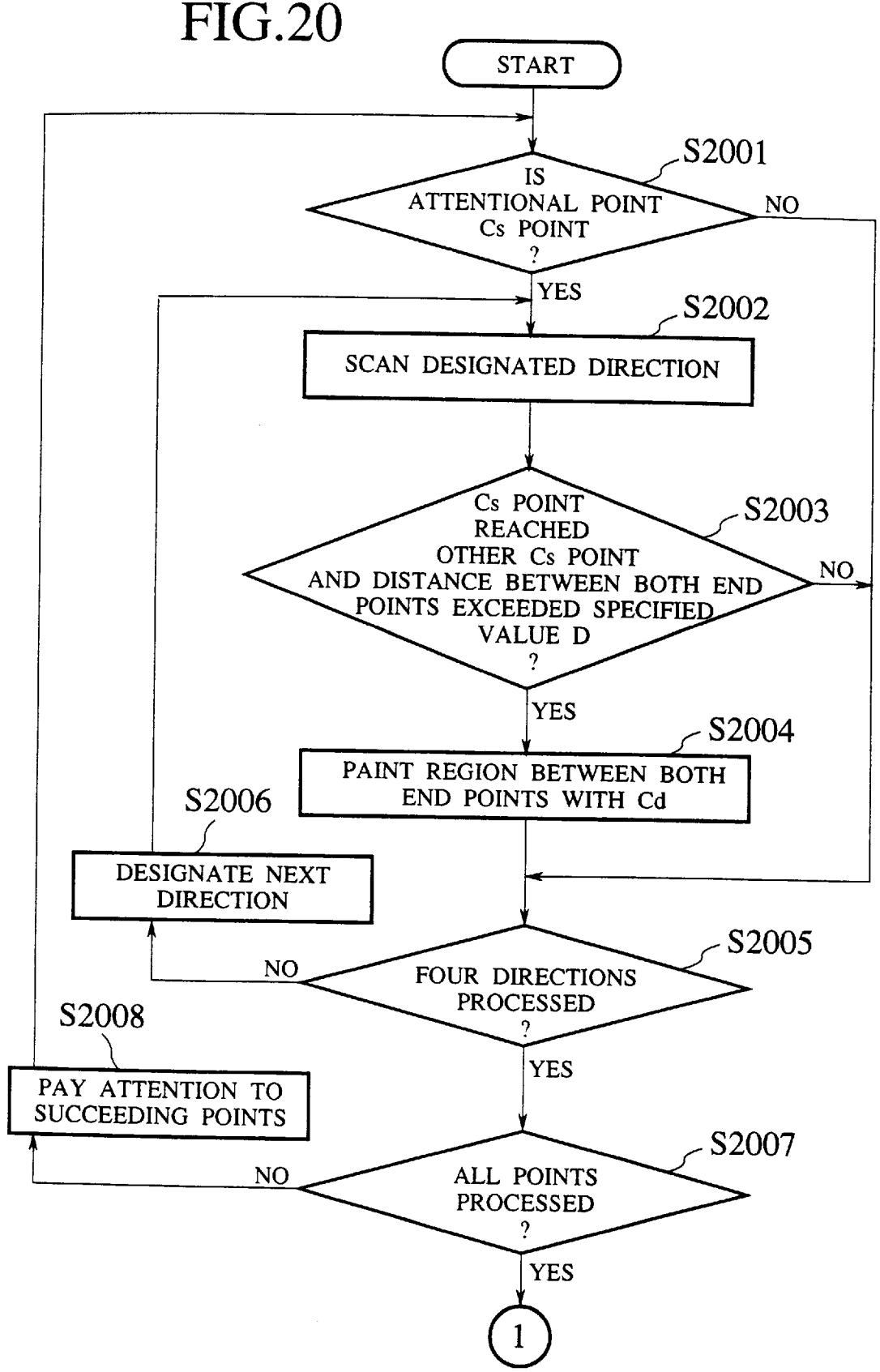
FIG. 20 is a flowchart illustrating the former half of process procedures of a road plane determining section in FIG. 16.

In FIG. 20, first it may be decided whether or not the attentional point is Cs colored (step 2001). If NO, then the process directly goes to step 2005. While, if YES, then scanning may be executed from the attentional sampling point to the Co, Cr or Cs colored point in the forward/backward directions of one of four directions, as described above (step 2002). As a result of scanning, when reaching to other Cs colored point, it may be determined whether or not the distance between both end points is in excess of a specified value D (step 2003). If the result is negative, then the process may directly goes to step 2005, while if the result is affirmative, then it has been decided that the area between both end points is the road plane to thus be painted with the color Cd (step 2004).

In step 2005, it may be decided whether or not the process has been done in four directions. If NO, then the next direction may be designated (step 2006), and the process may return to step 2002 to repeat the process. On the contrary, if it has been decided that the process has been done in four directions, then it may be decided whether or not the process has been executed on all points (step 2007). Unless the process has been executed on all points, then attention may be paid to a succeeding point (step 2008) and the process may return to step 2001 wherein the process may be repeated. If the process has been executed on all points, then the attentional point may be reset to an initial state, and then the following process will be executed.

Figure 21:
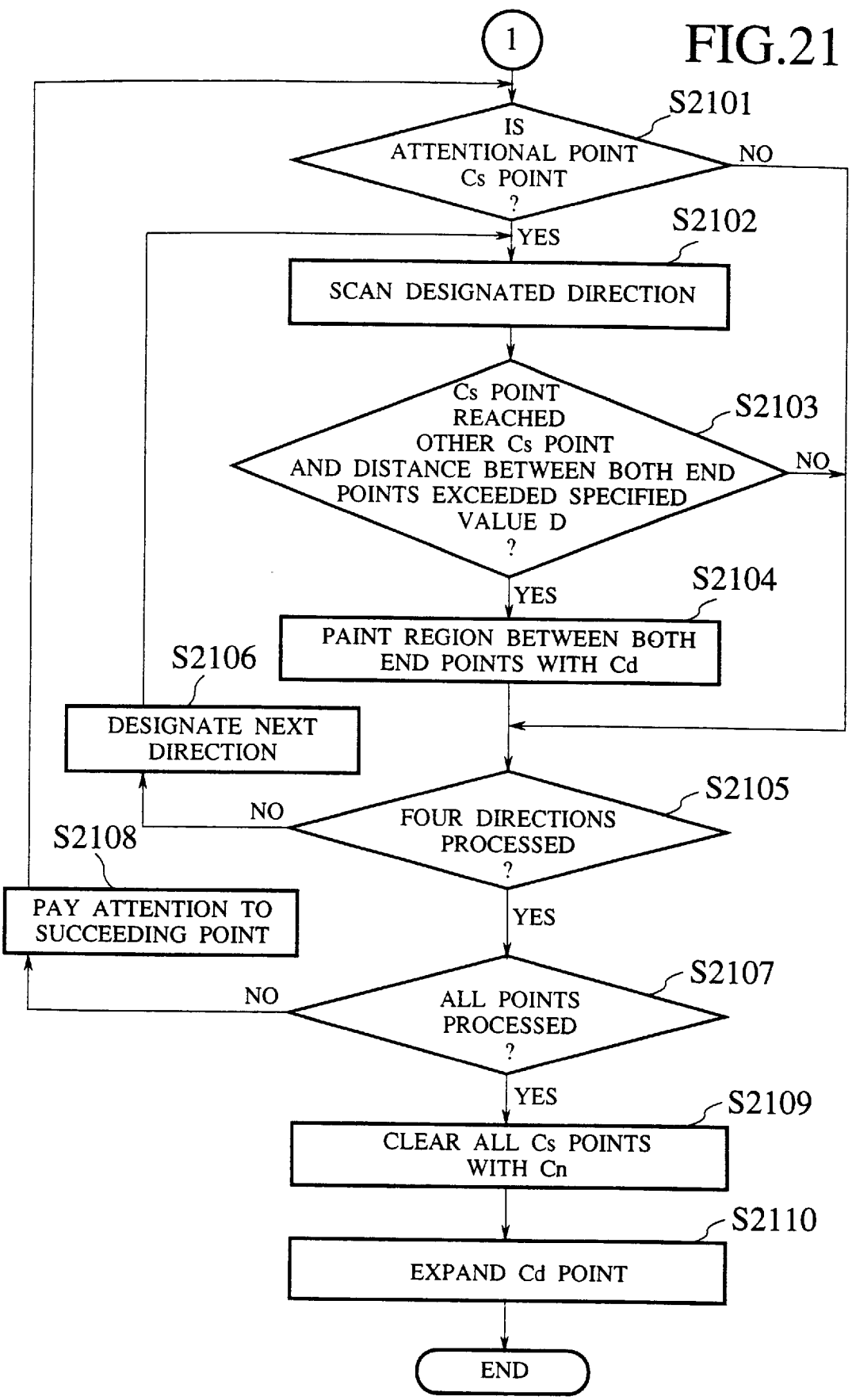
FIG. 21 is a flowchart illustrating the latter half of process procedures of a road plane determining section in FIG. 16.

More particularly, in FIG. 21, first it may be decided whether or not the attentional point is Cd colored (step 2101). Unless the attentional point is Cd colored, then the process directly goes to step 2105. While if the attentional point is Cd colored, then scanning may be executed from the attentional sampling point to the Co, Cr or Cs colored point in the forward/backward directions of one of four directions, as described above (step 2102). As the result of scanning, when reaching to other Cd colored point, it may be determined whether or not the distance between both end points is in excess of a specified value D (step 2103). If the result is negative, then the process may directly goes to step 2105, while if the result is affirmative, then it has been decided that the area between both end points is the road plane to thus be painted with the color Cd (step 2104).

Figure 27:
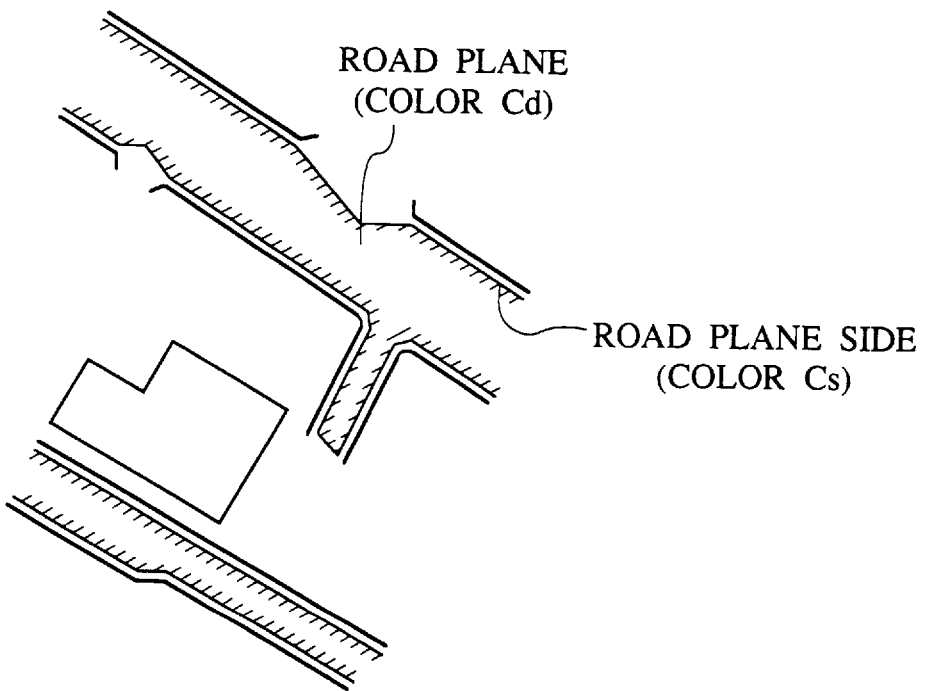
FIG. 27 is a fragmental enlarged view illustrating an example of a image wherein road planes have been painted out.

In step 2105, it may be decided whether or not the process has been done in four directions. If NO, then the next direction may be designated (step 2106), and the process may return to step 2102 to repeat the process. On the contrary, if it has been decided that the process has been done in four directions, then it may be decided whether or not the process has been executed on all points (step 2107). Unless the process has been executed on all points, then attention may be paid to succeeding point (step 2108) and the process may return to step 2101 wherein the process may be repeated. While if the process has been executed on all points, then the process may advance to step 2109. According to the process from step 2101 to step 2108, the regions such as the irregular profile crossing being not painted may be painted over. FIG. 27 shows an example of the image of painted-out road plane.

Figure 28:
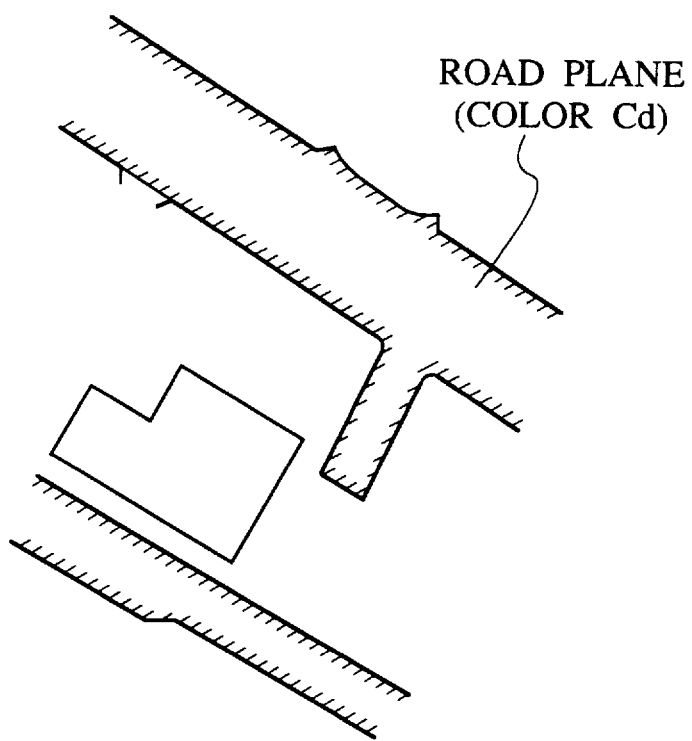
FIG. 28 is a fragmental enlarged view illustrating an example of a image wherein road planes have been determined after expansion process.
Figure 29:
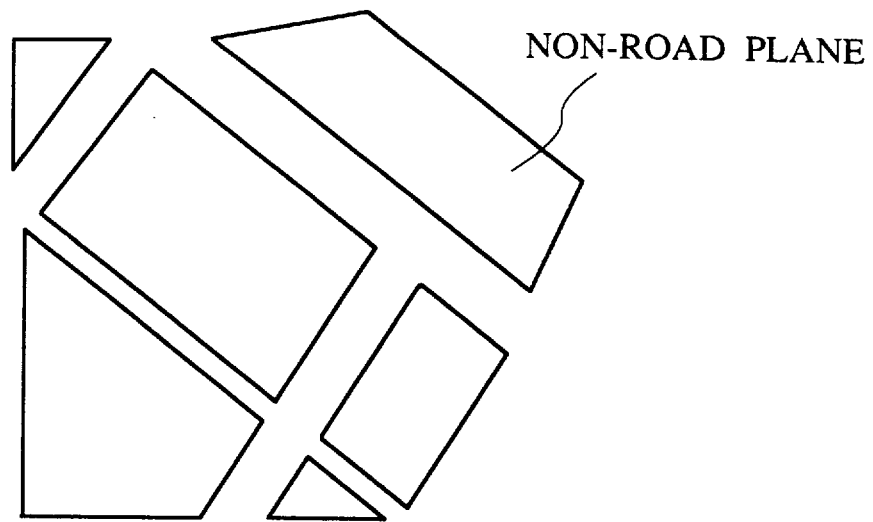
FIG. 29 is a fragmental enlarged view illustrating an example of a map wherein non-road planes have been digitized as closed polygons.
Figure 30:
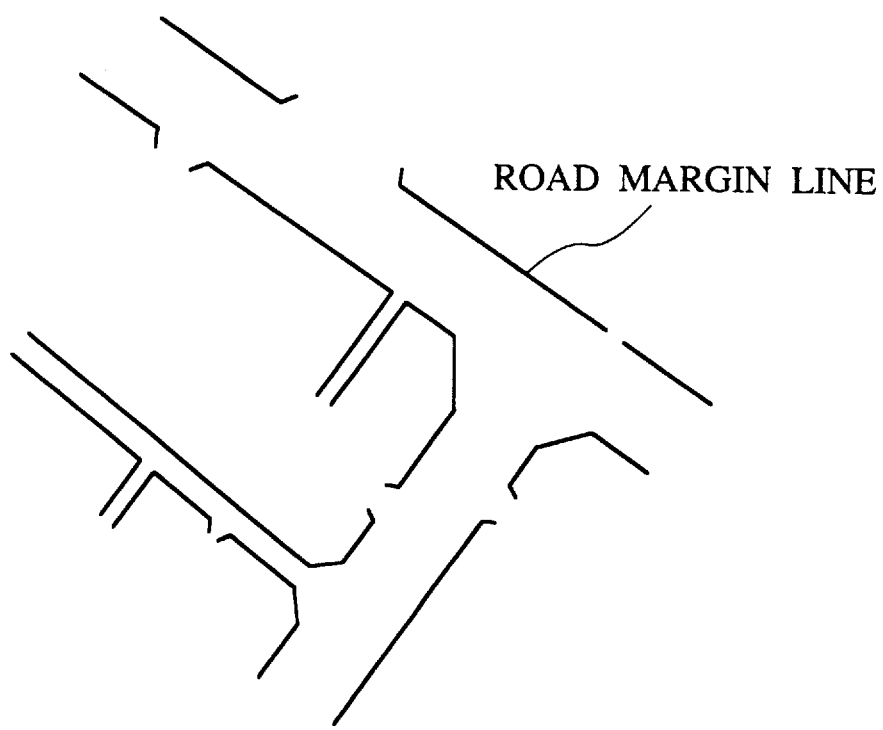
FIG. 30 is a fragmental enlarged view illustrating an example of a housing map wherein road margin lines have been represented by disconnected incomplete line segments.

In step 2109, all Cs colored points on the image buffer 64 may be cleared with the Cn color. Finally, clearances between road margins may be buried by expanding the Cd colored regions several times (step 2110). FIG. 28 shows an image derived by painting out the road plane in terms of expansion process for the image shown in FIG. 27.

With the above processes, road plan information 71 in which the road planes have been painted out with color Cd. The recognition processing section 6 may store road plan information 71 into the road plane information storing section 7. It should be noted that the road plane information storing section 7 may be actually the same section with the map information storing section 5.

Although the above processes are the processes by which automatically extract the road plane from disconnected road margin information, it is further feasible to apply modifications to the disconnected road margin information such as supplementation of incomplete portions, provision of directionality by attaching road plane side information to respective road margin lines by use of the extracted road plane information.

Although, in the above embodiments, various information have been distinguished by color information on the image buffer memory 64, a distinguishing way is not limited to this practice. Although an example has been explained wherein road recognition process may be executed by employing road margin line information 51 and non-road figure information 52, the process relating to non-road figure is negligible in the road plane candidate detecting section 61, the road plane side estimating section 62, and the road plane determining section 63 if non-road figure information 52 are not employed.

As has described above, according to the automatic road recognition method and the apparatus for the same, the road plane may be automatically recognized even from incomplete road margin lines including disconnection. In addition, since, with employing this recognized road plane information, the center line of the road plane may be calculated and also non-directional road margin lines may be converted into directional vector information which looking the road plane always on the fixed side, they are applicable to automatic extraction of the road network, etc. Furthermore, utility value of such map information as described in pp.21 can be enhanced by improving road data structure to a high degree.

It should be understood that many modifications and adaptations of the invention will become apparent to those skilled in the art and it is intended to encompass such obvious modifications and changes in the scope of the claimed appended hereto.

What is claimed is:

1. An automatic road recognition method employing a computer, comprising the steps of:

inputting road margin line information representing road profile on a map, to thus detect, with regard to portions being put between road margin lines, road plane candidate indices including indices as to parallelism between road margin lines and indices as to distance between road margin lines;

estimating that either side of the road margin lines is the road plane based on the road plane candidate indices on both sides of the road margin lines; and determining as the road plane a region which resides between two road margin lines opposing to each other on the side estimated as the road plane side.

2. An automatic road recognition method employing a computer, comprising the steps of:

inputting road margin line information representing road profile on a map and non-road figure information which cannot reside in road planes, to thus detect, with regard to portions being put between road margin lines, road plane candidate indices including parallelism indices as to parallelism between road margin lines, distance indices as to distance between road margin lines and non-road indices as to whether non-road figure resides in;

estimating that either side of the road margin lines is the road plane based on the road plane candidate indices on both sides of the road margin lines; and determining as the road plane a region which resides between two road margin lines opposing to other on the side estimated as the road plane side and in which each the non-road figure cannot reside.

3. An automatic road recognition apparatus comprising:

road candidate detecting means for detecting, with regard to portions being put between road margin lines, road plane candidate indices including parallelism indices as to parallelism between road margin lines and distance indices as to distance between road margin lines by inputting road margin line information representing road profile on a map;

road plane side estimating means for estimating that either side of the road margin lines is the road plane based on the road plane candidate indices on both sides of the road margin lines; and road plane determining means for determining as the road plane a region which resides between two road margin lines opposing to each other on the side estimated as the road plane side.

4. A map information processing method employing a computer, comprising the steps of:

inputting a road network map which includes road constituent points formed of starting points, end points and interpolation points, and information indicating locations of the road constituent points and represents connection relations between respective roads as a graphic structure, and another arbitrary map which includes road profile information;

detecting a plurality of corresponding candidate points as candidates of corresponding points on the other arbitrary map to the road constituent points by collating road images near respective road constituent points on the road network map with road images of corresponding location on the other arbitrary map; and correlating road location on the road network map with road location on the other arbitrary map, by selecting one of the plurality of corresponding candidate points one by one with respect to respective road constituent points, summing up differences between feature amounts representing intersecting angles of roads to be connected mutually on respective road constituent points of shifted road network and feature amounts on respective road constituent points of original road network while shifting respective road constituent points to locations of selected corresponding candidate points, and determining one corresponding candidate point based on amount of the summed differences corresponding to respective corresponding candidate points.

5. A map information processing method according to claim 4, further comprising, after determining one corresponding candidate point with respect to respective road constituent points, the steps of:

selecting two from respective corresponding candidate points at a time;

determining that either of both corresponding candidate points has high correspondence rate to a corresponding road on the other arbitrary map; and rotating and shifting other corresponding candidate point while a corresponding candidate point which is determined to have the high correspondence rate being fixed until the correspondence rate of other corresponding candidate point to road on the other arbitrary map takes a maximum value.

6. A map information processing method according to claim 4, further comprising, after determining one corresponding candidate point with respect to respective road constituent points, the steps of:

selecting two from respective corresponding candidate points at a time;

determining that either of both corresponding candidate points has high correspondence rate to a corresponding road on the other arbitrary map; and rotating and shifting other corresponding candidate point while a corresponding candidate point which is determined to have the high correspondence rate being fixed until an angle between an angle of road network obtained based on both corresponding candidate points and an angle of a road on the other arbitrary map takes a minimum value.

7. A map information processing method according to any of claims 4 to 6, further comprising the steps of:

inputting the road network map with the other arbitrary map based on correlation of road location between the road network map and the other arbitrary map by effecting correlation with respect to map information other than road.

8. A map information processing method according to any of claims 4 to 6, further comprising the steps of:

making new maps based on correlation of road location between the road network map and the other arbitrary map by effecting correlation with respect to map information other than road.

9. A map information processing method according to any of claims 4 to 6, wherein said other arbitrary map is a high precision map or a large-scale map including road profile information which has higher location precision than that of the road network map.

10. A map information processing method according to claim 7, wherein said other arbitrary map is a high precision map or a large-scale map including road profile information which has higher location precision than that of the road network map.

11. A map information processing method according to claim 8, wherein said other arbitrary map is a high precision map or a large-scale map including road profile information which has higher location precision than that of the road network map.

12. A map information processing method according to claim 4, further comprising, if the road profile information on the other arbitrary map comprise disconnected incomplete road margin lines, the steps of:

inputting road margin line information representing road profile on a map, to thus detect, with regard to portions being put between road margin lines, road plane candidate indices including parallelism indices as to parallelism between road margin lines and distance indices as to distance between road margin lines;

estimating that either side of the road margin lines is the road plane based on the road plane candidate indices on both sides of the road margin lines;

determining as the road plane a region which resides between two road margin lines opposing to each other on the side estimated as the road plane side; and performing the input of the other arbitrary map which being simultaneously performed with the input of the road network map.

13. A map information processing method according to claim 4, further comprising, if the road profile information on the other arbitrary map comprise disconnected incomplete road margin lines, the steps of:

inputting road margin line information representing road profile on a map and non-road figure information which cannot reside in road planes, to thus detect, with respect to portions being put between road margin lines, road plane candidate indices including parallelism indices as to parallelism between road margin lines, distance indices as to distance between road margin lines and non-road indices as to whether non-road figure resides in;

estimating that either side of the road margin lines is the road plane based on the road plane candidate indices on both sides of the road margin lines;

determining as the road plane a region which resides between two road margin lines opposing to each other on the side estimated as the road plane side and in which the non-road figure cannot reside; and performing the input of the other arbitrary map which being simultaneously performed with the input of the road network map.

14. A map information processing apparatus for correlating road location on the road network map with road location on another arbitrary map by inputting a road network map which includes road constituent points formed of starting points, end points and interpolation points, and information indicating locations of the road constituent points and represents connection relations between respective roads as a graphic structure, and another arbitrary map which includes road profile information, the apparatus comprising:

corresponding candidate detecting means for detecting a plurality of corresponding candidate points as candidates of corresponding points on the other arbitrary map to the road constituent points by collating road images near respective road constituent points on the road network map with road images of corresponding location on the other arbitrary map; and correspondence determining means for selecting one of the plurality of corresponding candidate points one by one with respect to respective road constituent points, summing up differences between feature amounts representing intersecting angles of roads to be connected mutually on respective road constituent points of shifted road network and feature amounts on respective road constituent points of original road network while shifting respective road constituent points to locations of selected corresponding candidate points, and determining one corresponding candidate point based on amount of the summed differences corresponding to respective corresponding candidate points.

15. A map information processing apparatus according to claim 14, wherein, after determining one corresponding candidate point with respect to respective road constituent points, the correspondence determining means selecting two from respective corresponding candidate points at a time, determining that either of both corresponding candidate points has high correspondence rate to a corresponding road on the other arbitrary map, and rotating and shifting other corresponding candidate point while a corresponding candidate point which is determined to have the high correspondence rate being fixed until the correspondence rate of other corresponding candidate point to road on the other arbitrary map takes a maximum value.

16. A map information processing apparatus according to claim 14, wherein, after determining one corresponding candidate point with respect to respective road constituent points, the correspondence determining means selecting two from respective corresponding candidate points at a time, determining that either of both corresponding candidate points has high correspondence rate to a corresponding road on the other arbitrary map, and rotating and shifting other corresponding candidate point while a corresponding candidate point which is determined to have the high correspondence rate being fixed until an angle between an angle of road network obtained based on both corresponding candidate points and an angle of a road on the other arbitrary map.

17. A map information processing apparatus according to any of claims 14 to 16, wherein, if the road profile information on the other arbitrary map comprise disconnected incomplete road margin lines, prior to process in the corresponding candidate detecting section, road margin line information representing road profile on a map are input to thus detect, with respect to portions being put between road margin lines, road plane candidate indices including parallelism indices as to parallelism between road margin lines and distance indices as to distance between road margin lines, either side of the road margin lines is estimated as the road plane based on the road plane candidate indices on both sides of the road margin lines, and a region which resides between two road margin lines opposing to each other on the side estimated as the road plane side is determined as the road plane.

18. A map information processing apparatus according to any of claims 14 to 16, wherein, if the road profile information on the other arbitrary map comprise disconnected incomplete road margin lines, prior to process in the corresponding candidate detecting section, road margin line information representing road profile on a map and non-road figure information which cannot reside in road planes are input to thus detect, with respect to portions being put between road margin lines, road plane candidate indices including parallelism indices as to parallelism between road margin lines, distance indices as to distance between road margin lines and non-road indices as to whether non-road figure resides in, either side of the road margin lines is estimated as the road plane based on the road plane candidate indices on both sides of the road margin lines, and a region which resides between two road margin lines opposing to each other on the side estimated as the road plane side and in which the non-road figure cannot reside is determined as the road plane.

\* \* \* \* \*